US011093025B2

United States Patent
Kakehashi et al.

(10) Patent No.: US 11,093,025 B2
(45) Date of Patent: Aug. 17, 2021

(54) VIRTUAL-REALITY PROVISION SYSTEM, THREE-DIMENSIONAL-DISPLAY-DATA PROVISION DEVICE, VIRTUAL-SPACE PROVISION SYSTEM, AND PROGRAM

(71) Applicant: BASCULE INC., Tokyo (JP)

(72) Inventors: Yoshio Kakehashi, Tokyo (JP); Masayoshi Boku, Tokyo (JP)

(73) Assignee: BASCULE INC., Tokyo (JP)

( * ) Notice: Subject to any disclaimer, the term of this patent is extended or adjusted under 35 U.S.C. 154(b) by 6 days.

(21) Appl. No.: 16/604,469

(22) PCT Filed: Apr. 10, 2018

(86) PCT No.: PCT/JP2018/015012
§ 371 (c)(1),
(2) Date: Oct. 10, 2019

(87) PCT Pub. No.: WO2018/190327
PCT Pub. Date: Oct. 18, 2018

(65) Prior Publication Data
US 2020/0150749 A1    May 14, 2020

(30) Foreign Application Priority Data
Apr. 11, 2017    (JP) .............................. JP2017-078385

(51) Int. Cl.
*G09G 5/00*    (2006.01)
*G06F 3/01*    (2006.01)
(Continued)

(52) U.S. Cl.
CPC .......... *G06F 3/011* (2013.01); *A63B 69/0002* (2013.01); *A63B 71/0622* (2013.01);
(Continued)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS

| 6,124,862 A | 9/2000 | Boyken et al. |
| 2009/0009605 A1* | 1/2009 | Ortiz .................. H04N 21/4181 |
| | | 348/157 |

(Continued)

FOREIGN PATENT DOCUMENTS

| JP | 2002-518722 A | 6/2002 |
| JP | 2008-284166 A | 11/2008 |

(Continued)

OTHER PUBLICATIONS

Challenging fastball of 165 km/h! Asking to developer of "VR Dream Match—Baseball", [online], Dec. 10, 2016, [retrieval date May 30, 2018], internet <URL:http://www.sensors.jp/post/vr-dream-match-baseball.html>.

(Continued)

*Primary Examiner* — Gordon G Liu
(74) *Attorney, Agent, or Firm* — Sughrue Mion, PLLC

(57) ABSTRACT

Provided is a virtual-reality provision system having: a tracking data acquisition unit that acquires tracking data on a flying object thrown by an athlete, the data being obtained from sensor information from a sensor that tracks the flying object; a three-dimensional-display-data generation unit that uses the acquired tracking data to generate three-dimensional display data used to display, in a virtual space, a flight video of a virtual flying object corresponding to said flying object; at least one virtual-space provision system that displays the flight video of the virtual flying object in the virtual space by using the three-dimensional display data; and a transmission unit that transmits the three-dimensional (Continued)

display data to the at least one virtual-space provision system.

11 Claims, 24 Drawing Sheets

(51) Int. Cl.
*A63B 69/00* (2006.01)
*A63B 71/06* (2006.01)
*G02B 27/01* (2006.01)
*G06K 9/00* (2006.01)

(52) U.S. Cl.
CPC ..... *G02B 27/0172* (2013.01); *G06K 9/00671* (2013.01); *A63B 2069/0008* (2013.01); *A63B 2071/0636* (2013.01); *A63B 2071/0647* (2013.01); *A63B 2071/0666* (2013.01); *G02B 2027/0141* (2013.01)

(58) Field of Classification Search
USPC .......................................................... 345/633
See application file for complete search history.

(56) References Cited

U.S. PATENT DOCUMENTS

| | | | | |
|---|---|---|---|---|
| 2011/0141232 A1* | 6/2011 | Tsukagoshi | .......... | H04N 21/658 348/43 |
| 2011/0296318 A1* | 12/2011 | Takayama | .............. | G06Q 30/02 715/757 |
| 2015/0248917 A1* | 9/2015 | Chang | .................... | G11B 27/28 386/282 |
| 2016/0175702 A1* | 6/2016 | Black | .................... | G06T 19/006 463/31 |
| 2016/0353425 A1* | 12/2016 | Iwami | .............. | H04N 21/43637 |

FOREIGN PATENT DOCUMENTS

| | | |
|---|---|---|
| JP | 2016-047219 A | 4/2016 |
| WO | 2016/094893 A1 | 6/2016 |

OTHER PUBLICATIONS

Masaki Takahashi, et al., "Development of ball trajectory visualization system for live baseball broadcasts and application to other sports", NHK STRL R&D, Nov. 15, 2008, pp. 22-29, No. 112, ISSN 0914-7535.
<High reality image communication technique and image encoding technique> Utilizing high reality image communication technique to training, and making efforts on parallelization and stable control in image encoding, Feb. 1, 2016, pp. 18-19, vol. 53, No. 2, ISSN 0385-695X.
The advent of "VR batting center" supervised by professional baseball team!?, Rakuten having used it in ernest since 2017, [online], Sep. 6, 2016 retrieval date May 30, 2018, internet:<URL: http://www.inside-games.jp/article/2016/09/06101620.html>.
International Preliminary Report on Patentability of PCT/JP2018/015012 dated Aug. 5, 2019.
Written Opinion of the International Searching Authority of PCT/JP2018/015012 dated Jun. 12, 2018.
International Search Report of PCT/JP2018/015012 dated Jun. 12, 2018.
Takanohashi et al., "Measurement of 3D Ball Trajectory Using Motion Blur", IPSJ Transactions on Computer Vision and Image Media, Information Processing Society of Japan, Feb. 2007, vol. 48, No. SIG1(CVIM17), pp. 35-47 (16 pgs. total).
Communication dated Jan. 8, 2020, issued by the Japan Patent Office in application No. 2019-512520.
Sadlyltsbradley, "VR Baseball—Home Run Derby—HTC Vive", youtube [online][video], Apr. 4, 2021, The [date of search Mar. 5, 2021], especially 0:30-3:30, hups://www.youtube.com/watch?v=8EDTBaGljNU (1 page total).
Office Action dated Mar. 24, 2021 from the Japanese Patent Office in Japanese Patent Application No. 2020-069086.

* cited by examiner

FIG. 6

| THREE-DIMENSIONAL DATA | TIMING INFORMATION |

OR

| THREE-DIMENSIONAL DATA | THREE-DIMENSIONAL DATA IDENTIFICATION INFORMATION |

VIRTUAL-REALITY PROVISION SYSTEM, THREE-DIMENSIONAL-DISPLAY-DATA PROVISION DEVICE, VIRTUAL-SPACE PROVISION SYSTEM, AND PROGRAM

CROSS REFERENCE TO RELATED APPLICATIONS

This application is a National Stage of International Application No. PCT/JP2018/015012 filed Apr. 10, 2018, claiming priority based on Japanese Patent Application No. 2017-078385 filed Apr. 11, 2017.

TECHNICAL FIELD

The present invention relates to a virtual-reality provision system, a three-dimensional-display-data provision device, a virtual-space provision system, and a program.

BACKGROUND ART

A head mounted display (HMD), being mounted to the head of a user and being capable of presenting a three-dimensional virtual space image to the user by a display, etc. located before his eyes, has been known. A training support system using the head mounted display is disclosed in Patent Literature 1.

The training support system of the Patent Literature 1 comprises an HMD having display means that is mounted on the head of a user to present a three-dimensional video of a virtual space where a virtual moving body as a virtual object of a tool that the user handles is arranged, head position detection means for detecting a position and a posture of the head of the user, angular velocity detection means that is attached to the tool, calculation means for calculating trajectory data of the virtual moving body based on angular velocity data obtained by the angular velocity detection means, storage means for storing the trajectory data, and image generation means for generating a trajectory video of the virtual moving body in the virtual space based on the trajectory data to cause display means to present the trajectory video viewed from a viewpoint position in the virtual space, the viewpoint position corresponding to the position and the posture of the head of the user detected by the head position detection means.

CITATION LIST

Patent Literature

[PATENT LITERATURE 1] JP 2016-47219A

SUMMARY OF INVENTION

Technical Problem

People all over the world enjoy sports, e.g., not only domestic professional baseball broadcasting and J. League relay broadcasting but also the worldwide events such as the Olympic Games and the World Cup, live on TV or via internet from home.

The live video is for watching games but the performance of an athlete in the video cannot be sensed.

To solve the above problem, the present invention provides a virtual-reality provision system, a three-dimensional-display-data provision device, a virtual-space provision system, and a program that can allow a person to experience the performance of the athlete from a video in addition to watching the performance of the athlete from the video.

Solution to Problem

According to an aspect of the present invention, there is provided a virtual-reality provision system comprising: a tracking data acquisition unit for acquiring tracking data of a flying object thrown by an athlete, the tracking data being obtained from sensor information of a sensor that tracks the flying object; a three-dimensional-display-data generation unit for generating, by using the acquired tracking data, three-dimensional display data to display a flight video of a virtual flying object, in a virtual space, corresponding to the flying object; at least one virtual-space provision system for displaying, by using the three-dimensional display data, the flight video of the virtual flying object in the virtual space; and a transmission unit for transmitting the three-dimensional display data to the at least one virtual-space provision system.

According to an aspect of the present invention, there is provided a three-dimensional-display-data provision device comprising: a tracking data acquisition unit for acquiring tracking data of a flying object thrown by an athlete, the tracking data being obtained from sensor information of a sensor that tracks the flying object; a three-dimensional-display-data generation unit for generating, by using the acquired tracking data, three-dimensional display data to display a flight video of a virtual flying object, corresponding to the flying object, in a virtual space displayed on a virtual-space provision system; and a transmission unit for transmitting the three-dimensional display data to the at least one virtual-space provision system.

According to an aspect of the present invention, there is provided a virtual-space provision system comprising: a display unit for displaying a virtual space; a reception unit for receiving three-dimensional display data that was generated based on tracking data obtained from sensor information of a sensor that tracks a flying object thrown by an athlete to display, in the virtual space, a flight video of a virtual flying object corresponding to the flying object; detecting unit for detecting a position of a user and an orientation of the user in the virtual space; and an image processing unit for displaying on the display unit, by using the three-dimensional display data of the virtual flying object, object data of the virtual flying object, and the position and the orientation of the user, a flight video of the virtual flying object viewed from a viewpoint position in the virtual space, the viewpoint position corresponding to the user's position and posture.

According to an aspect of the present invention, there is provided a program that makes a computer execute: tracking data acquisition processing of acquiring tracking data of a flying object thrown by an athlete, the tracking data being acquired from sensor information of a sensor that tracks the flying object; three-dimensional display data generation processing of generating, by using the acquired tracking data, three-dimensional display data to display a flight video of a virtual flying object corresponding to the flying object in a virtual space that is to be displayed on at least one virtual-space provision system; and transmission processing of transmitting the three-dimensional display data to the at least one virtual-space provision system.

According to an aspect of the present invention, there is provided a computer program for a virtual-space provision system that provides a three-dimensional video of a virtual space to a user, the program making a computer execute: reception processing of receiving three-dimensional display data, generated based on tracking data obtained from sensor information of a sensor that tracks a flying object thrown by an athlete, to display a flight video of a virtual flying object corresponding to the flying object in the virtual space; detection processing of detecting a position data of a user and an orientation data of the user in the virtual space; and image processing of displaying on a display unit, by using the three-dimensional display data of the virtual flying object, object data of the virtual flying object, and the user's position data and the user's orientation data, a flight video of the virtual flying object viewed from a viewpoint position in the virtual space, the viewpoint position corresponding to the user's position and posture.

Advantageous Effect of Invention

According to the present invention, one can watch the performance of an athlete from a video as well as have an experience of the performance of the athlete.

BRIEF DESCRIPTION OF DRAWINGS

FIG. 6 illustrates a data configuration of three-dimensional display data.

DESCRIPTION OF EMBODIMENTS

First Embodiment

Figure 1:
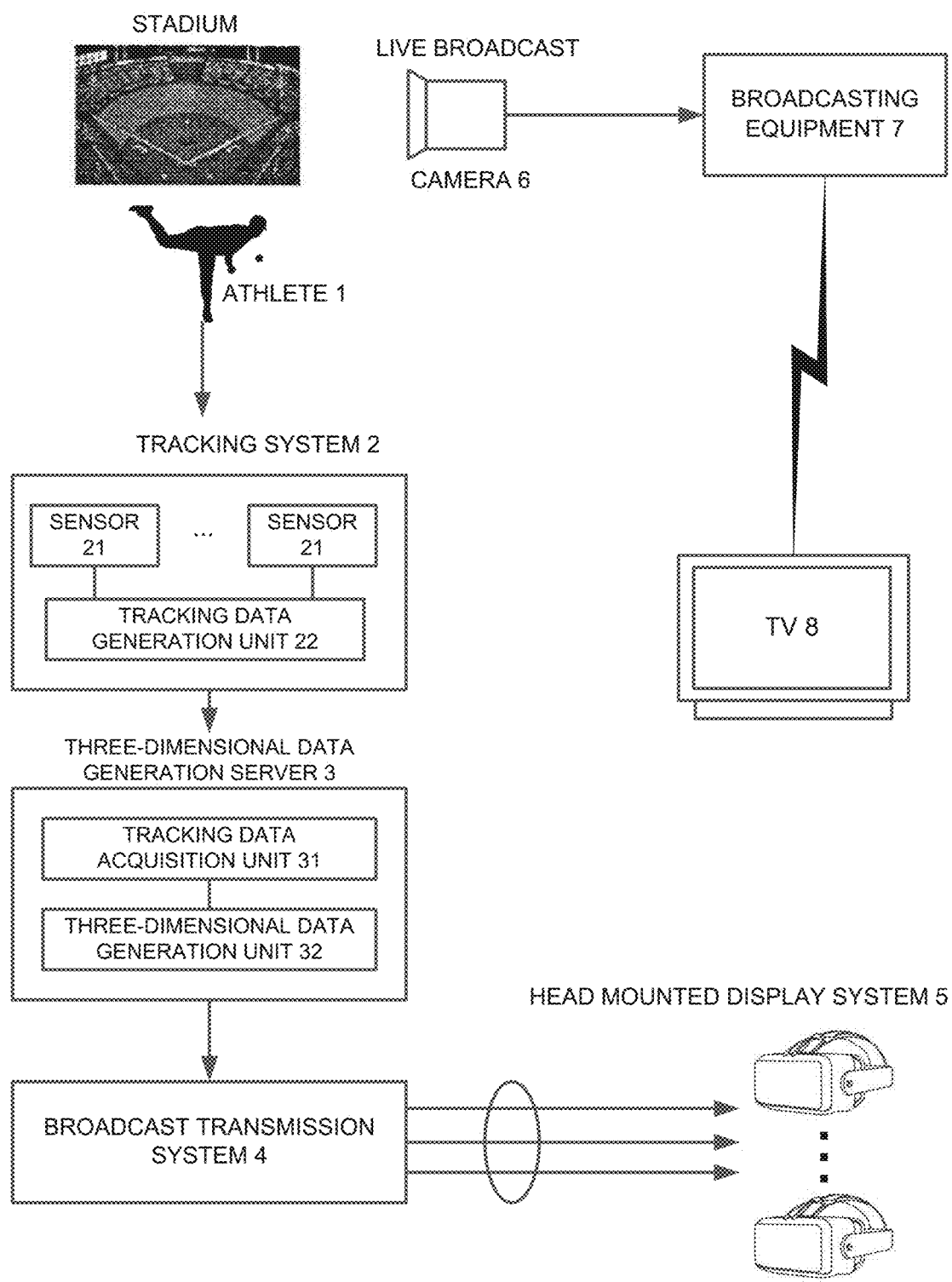
FIG. 1 is a schematic block diagram of a virtual-reality provision system according to a first embodiment.

A virtual-reality provision system according to a first embodiment will be described below in conjunction with the drawings. FIG. 1 is a schematic block diagram of the virtual-reality provision system according to the first embodiment.

In FIG. 1, 1 denotes a real athlete playing in a game in a stadium, etc.; 2 denotes a tracking system; 3 denotes a three-dimensional (3D) display data generation server; 4 denotes a broadcast transmission system; 5 denotes a head mounted display system (virtual-space provision system); 6 denotes a camera; 7 denotes broadcasting equipment; and 8 denotes a TV.

In the following description of the embodiment, a head mounted display system will be exemplified as a virtual-space provision system. The virtual-space provision system, however, is not limited to the head mounted display system but may be anything which can present a three-dimensional virtual space to a user. For example, it is possible to employ such a system that the user, wearing a linear polarizing filter type glasses or a liquid crystal shutter type glasses, views a screen that displays concurrently captured videos for the left eye and for the right eye to thereby provide a virtual space to the user.

The athlete 1 is an athlete playing in a game, e.g., a professional baseball game, that is live on the air on TV, etc. The baseball game is shot by a camera 6 and a video of the game is broadcasted via broadcasting equipment 7 to be viewed via a TV 8. In the present embodiment, a baseball game is exemplified but any of a tennis match, a ping-pong match, a golf match, a succor game, a martial arts match (boxing match, fencing match) will do.

The tracking system 2 is a system that tracks an athlete 1 and a flying object thrown by the athlete 1 to convert the tracking results into data. Here, the flying object is exemplary represented by, but not limited to, a ball which flies by being thrown or kicked by the athlete 1. The flying object may be replaced by a part of the body of the athlete 1 (e.g., a punch in boxing match) and a tool worn by the athlete 1 (e.g., a fencing sword).

The tracking system 2 comprises a sensor 21 such as a radar and a camera and a tracking data generation unit 22 that generates, based on data obtained from the sensor 21, tracking data of the athlete 1, a ball, and an umpire on the mound. Systems such as a TrackMan and a PITCHf/x are provided as representative examples of the tracking system 2. In the present embodiment, tracking data of all the moving bodies (athlete 1, umpire, etc.) on the mound is not required.

It is enough that the tracking system 2 can generate tracking data of at least the flying object (e.g., ball) thrown by the athlete 1.

Figure 2:
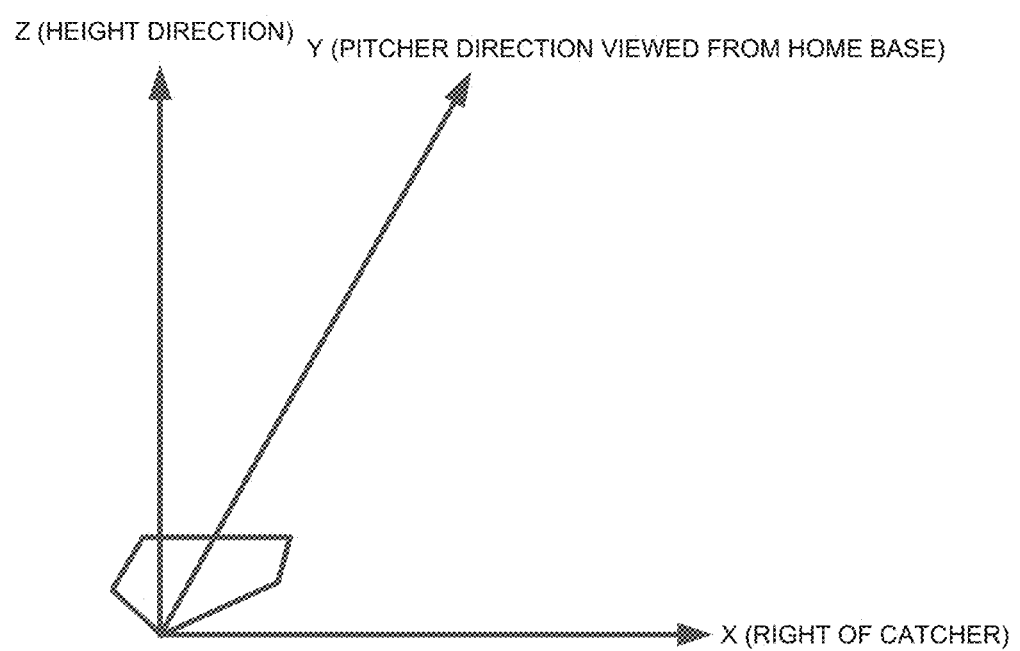
FIG. 2 is a coordinate system illustrating parameters of tracking data.

When tracking a ball thrown by a pitcher, the following parameters are exemplified as tracking data that the tracking data generation unit 22 of the present embodiment generates. A coordinate system of each parameter starts, as shown in FIG. 2, from a predetermined position over a home base. In the coordinate system, a direction of a pitcher viewed from a catcher is decided as a front; the right of the catcher is decided as an X direction (X-axis); a direction of the pitcher viewed from the catcher is decided as a Y direction (Y-axis); and a height direction is decided as a Z direction (Z-axis).

Figure 3:
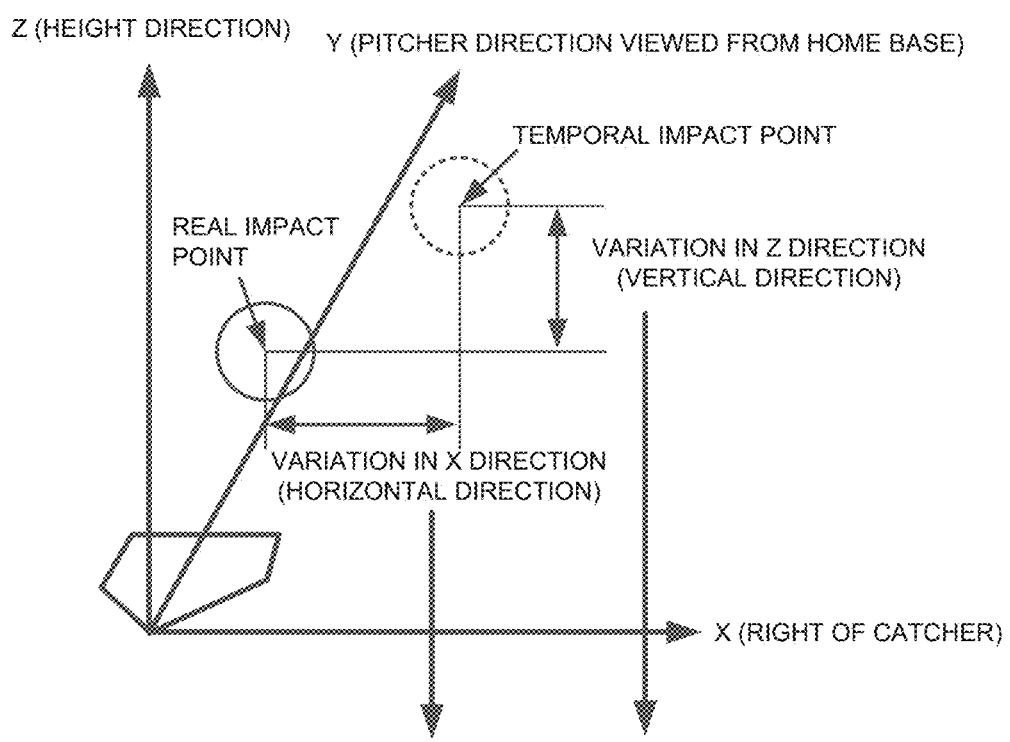
FIG. 3 illustrates variation of the parameters.

(1) coordinates of a release point where a ball leaves from a pitcher (release-point coordinates)
(2) a speed of a pitched ball (initial velocity)
(3) coordinates of a predetermined pass point over the home base (actual impact-point coordinates)
(4) variation in the vertical direction (Z direction) and the horizontal direction (X direction) from about the release point to about the home base Here, as shown in FIG. 3, the variation is a difference between temporal impact point coordinates of a ball over the home base, the ball having the same vector when being released but has no-rotation and thus no-curving, and impact point coordinates of a ball actually thrown, respectively, in the vertical direction and the horizontal direction.

Figure 4:
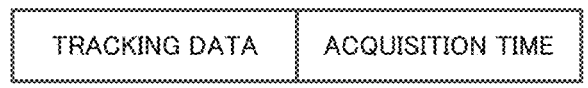
FIG. 4 illustrates a data configuration of tracking data.

Any sort of tracking data may be acceptable so long as the data can represent a motion of the athlete 1, the ball, or the like. As for the tracking system 2, it is preferable that an acquisition time when acquiring tracking data is contained in the tracking data, for example, as shown in FIG. 4.

The three-dimensional (3D) display data generation server 3 generates, based on the tracking data, three-dimensional display data (three-dimensional coordinate data) to display a flying object, e.g., a ball, as a virtual flying object visualized in a virtual space and a real athlete 1 as a virtual moving body visualized in the virtual space on a head mounted display system 5.

The three-dimensional-display-data generation server 3 comprises a tracking data acquisition unit 31 and a three-dimensional-display-data generation unit 32. The tracking data acquisition unit 31 acquires tracking data that is provided from the tracking system 2. The three-dimensional-display-data generation unit 32 generates, based on the tracking data, three-dimensional display data to display a virtual flying object, e.g., a virtual ball, and a virtual moving body. e.g., a virtual athlete 1, on the head mounted display system 5. The three-dimensional display data for displaying the virtual moving body of the real athlete 1 is not always required. It is enough that the tree-dimensional display data for displaying at least the virtual flying object can be generated.

Figure 5:
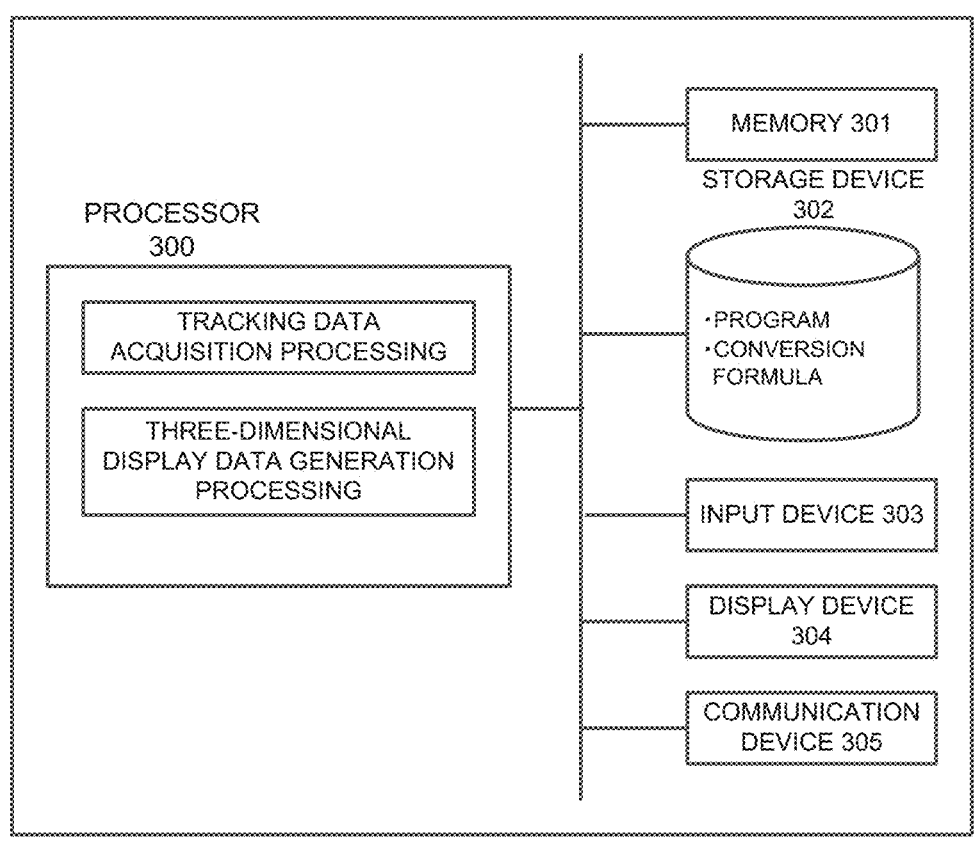
FIG. 5 is a block diagram of a three-dimensional-display-data generation server 3 composed of a computer system.

The three-dimensional-display-data generation server 3, specifically, can be realized by a computer system having a processor (information processing equipment) that performs all sorts of arithmetic processing. FIG. 5 is a block diagram illustrating the three-dimensional-display-data generation server 3 composed of a computer system.

The three-dimensional-display-data generation server 3 can be composed of a general purpose computer that comprises hardware resources such as a processor 300, a memory (ROM, RAM) 301, a storage device (hard disk, semiconductor disk, etc.) 302, an input device (keyboard, mouse, touch panel, etc.) 303, a display device 304, and a communication device 305.

In the three-dimensional-display-data generation server 3, a program stored in the storage device 302 is loaded into the memory 301 to be executed by the processor 300, thereby achieving tracking data acquisition processing and three-dimensional display data generation processing. Here, the tracking data acquisition processing is performed by the tracking data acquisition unit 31, and the three-dimensional display data generation processing is performed by the three-dimensional-display-data generation unit 32.

The tracking data acquisition processing is processing of acquiring tracking data provided from the tracking system 2.

The three-dimensional display data generation processing generates, based on the tracking data, three-dimensional display data to display a virtual flying object (a virtual ball in the present embodiment) and a virtual moving body such as a virtual athlete (a virtual athlete in the present embodiment) on the head mounted display system 5.

More specifically, when the tracking data is data relating to variation of a pitching ball, a hitting angle, and motions of an athlete, a batted ball, and a throwing ball on the field, such data is converted into three-dimensional display data that is essential for the head mounted display system 5 to display the virtual ball and the virtual athlete.

Here, the three-dimensional display data conceptually contains tracking data that is converted into data having a data form capable of being processed by the head mounted display system 5. Therefore, the three-dimensional display data generation processing may be processing that only converts the tracking data into data having a data form capable of being processed by the head mounted display system 5 or may be processing that generates from tracking data to trajectory data of, for example, a virtual flying object.

Next, described will be an example of generation of the three-dimensional display data that is essential for the head mounted display system 5 to reproduce and display, based on tracking data of a real ball, a virtual ball (virtual flying object) corresponding to the real ball when the virtual flying object is a ball thrown by a pitcher.

For causing the head mounted display system 5 to reproduce and display a flight video of the virtual ball (virtual flying object), the following four elements need to be set. The flight video of the virtual ball (virtual flying object) can be reproduced and displayed under the following condition.

(1) Releasing Point Coordinates

Releasing point coordinates can be obtained based on tracking data. Because the releasing point coordinates is set in accordance with a pitch motion of a virtual moving body of a pitcher displayed on the head mounted display system 5, it is not necessary that the releasing point coordinates is set to an exact coordinate value.

(2) Acceleration Added to Every Display Frame (Curving Force of a Ball) of the Head Mounted Display System 5

The acceleration can be obtained by dividing variation obtained based on tracking data with a display frame rate of the head mounted display system 5.

(3) Air Resistance Against a Ball

An air resistance against a ball is to be set in such a manner that the final velocity (speed around the real impact point coordinates) to the initial velocity becomes 90% to 92%.

(4) Initial Velocity Vector

Among the initial velocity vectors, a vector in the Y direction of a home base viewed from a pitcher can be calculated based on an initial velocity that is obtained based on the tracking data. On the other hand, vectors in the X direction and the Z direction viewed from a pitcher cannot be obtained based on the tracking data. Even in the absence of the vectors in the X direction and the Z direction among the initial velocity vectors, it is possible to simulate a pitching ball having the same speed and variation but a different actual impact point. In view of the above, while gradually changing values of the vectors in the X direction and the Z direction of the initial velocity vectors, the impact point of a ball is controlled to be closer to the real actual impact point. Vectors in the X direction and the Z direction when an impact point of a ball is closest to an actual impact point are employed as vectors in the X direction and the Z direction.

The three-dimensional display data generation processing generates those four elements as three-dimensional display data.

In the three-dimensional display data generation processing, for example, as shown in FIG. 6, timing information as to timing at which the head mounted display system 5 displays a flight video of a virtual ball (virtual flying object) is to be contained in the generated three-dimensional display data in such a manner that the timing information synchronizes with a predetermined video section of a game video of the athlete 1, the video section being on air via the broadcasting equipment 7.

Any sort of timing information can be employed in so far as a time of the predetermined video section can be specified. Examples of such timing information include time information, a time code of a game video of the athlete 1, etc. The predetermined video section can be, but not limited to, for example, a section where a commentator notifies to the effect that a viewer can experience the flight video of the virtual ball (virtual flying object) and a section where a notice is displayed on broadcast video to the effect that a viewer can experience the flight video of the virtual ball (virtual flying object). Also, the video section may conceptually include a case of a radio broadcast, i.e., a case of only sound. In acquiring the predetermined video section, the three-dimensional-display-data generation server 3 may store a predetermined video section or may receive a predetermined video section, as required, from the broadcasting equipment 7.

Use of such timing information enables reproduction of a flight video of a virtual ball (virtual flying object) of the best pitch thrown by a pitcher A by means of the head mounted display system 5, for example, after a scene (video section) in which the pitcher A threw the best pitch and in a video section notifying to the effect that the viewer can experience the best pitch of the pitcher A. This can realize a link to TV broadcast, etc.

The timing information needs to specify tracking data of a flying object that is actually thrown by the athlete 1. The specification of tracking data is realized by using an acquisition time of tracking data contained in the tracking data.

Alternatively, instead of using the timing information, as shown in FIG. 6, such another method may be employed that three-dimensional display data identification information capable of uniquely identifying three-dimensional display data is to be contained in three-dimensional display data and thereafter the three-dimensional display data containing the three-dimensional display data identification information is transmitted to the head mounted display system 5. Here, the three-dimensional display data identification information may be any information that can identify three-dimensional display data one from another. Examples of the three-dimensional display data identification information include the acquisition time of tracking data and an identifier that uniquely identifies three-dimensional display data.

In a case where the three-dimensional display data is configured to contain three-dimensional display data identification information, at the timing after a delivery of the three-dimensional display data containing three-dimensional display data identification information and at the timing when a flight video of a virtual ball (virtual flying object) is displayed on the head mounted display system 5, execution information containing the three-dimensional display data identification information that identifies the three-dimensional display data used in executing a virtual reality should be transmitted from the three-dimensional-display-data generation server 3 or the broadcast transmission system 4. The head mounted display system 5 receives the execution information to display, by using the three-dimensional display data that is specified with the three-dimensional display data identification information contained therein, the flight video of the virtual ball (virtual flying object) on the head mounted display system 5.

With the above described configuration, a link with the TV broadcast, etc. can be achieved in the same manner as a case where timing information is configured to be contained in the three-dimensional display data.

The three-dimensional display data is transmitted, via the broadcast transmission system 4, to at least one head mounted display system 5.

Further, the three-dimensional-display-data generation server 3 may perform, in addition to generation of three-dimensional display data, acquisition of only sound of a TV video of a game and transmission of the same together with the three-dimensional display data. At the time, time information should be attached to the sound data in order to allow synchronization between the acquisition time of the tracking data and the sound data. This achieves, as mentioned below, realization of a more realistic virtual space on the head mounted display system 5 because an actual live sound in the stadium is output when a video of a virtual space is displayed.

The three-dimensional-display-data generation server 3 may be composed of a single computer or may be composed of a distributed computing system using a plurality of computers. For acceleration of processing, a part or the entire of the function of the three-dimensional-display-data generation server 3 can be realized by using a dedicated hardware (e.g., GPU, FPGA, ASIC, etc.).

The broadcast transmission system 4 is a system that performs broadcast transmission of three-dimensional display data to a plurality of head mounted display systems 5 that are connected to a network. An example of the broadcast transmission system 4 includes a Content Delivery Network (CDN).

Preferably, the broadcast transmission system 4 performs broadcast transmission of the three-dimensional display data in real time synchronizing with video relaying of the TV broadcast of the game. To realize the above, an acquisition time of the tracking data contained in the three-dimensional display data is referred to a time code on a side of the TV video, thereby allowing the performance of broadcast transmission of the three-dimensional display data in accordance with the TV video.

The head mounted display (HMD) system 5 comprises a display unit that can display a three-dimensional video showing a depth to a user wearing the same. The head mounted display (HMD) system 5 is configured to be capable of displaying, on the display unit, a three-dimensional video of a virtual space where all sorts of virtual objects, etc. are arranged, the virtual objects being generated by the below mentioned arithmetic processing and image generation processing. When the head mounted display is mounted to the head of the user, the display unit is located to cover the user's eyes. The display unit displays a parallax image on the right and left image display surfaces respectively, thereby displaying a three-dimensional video to the user.

Accordingly, the user wearing the head mounted display on his head can experience a feeling close to a real situation from the three-dimensional video displayed in the virtual space.

Figure 7:
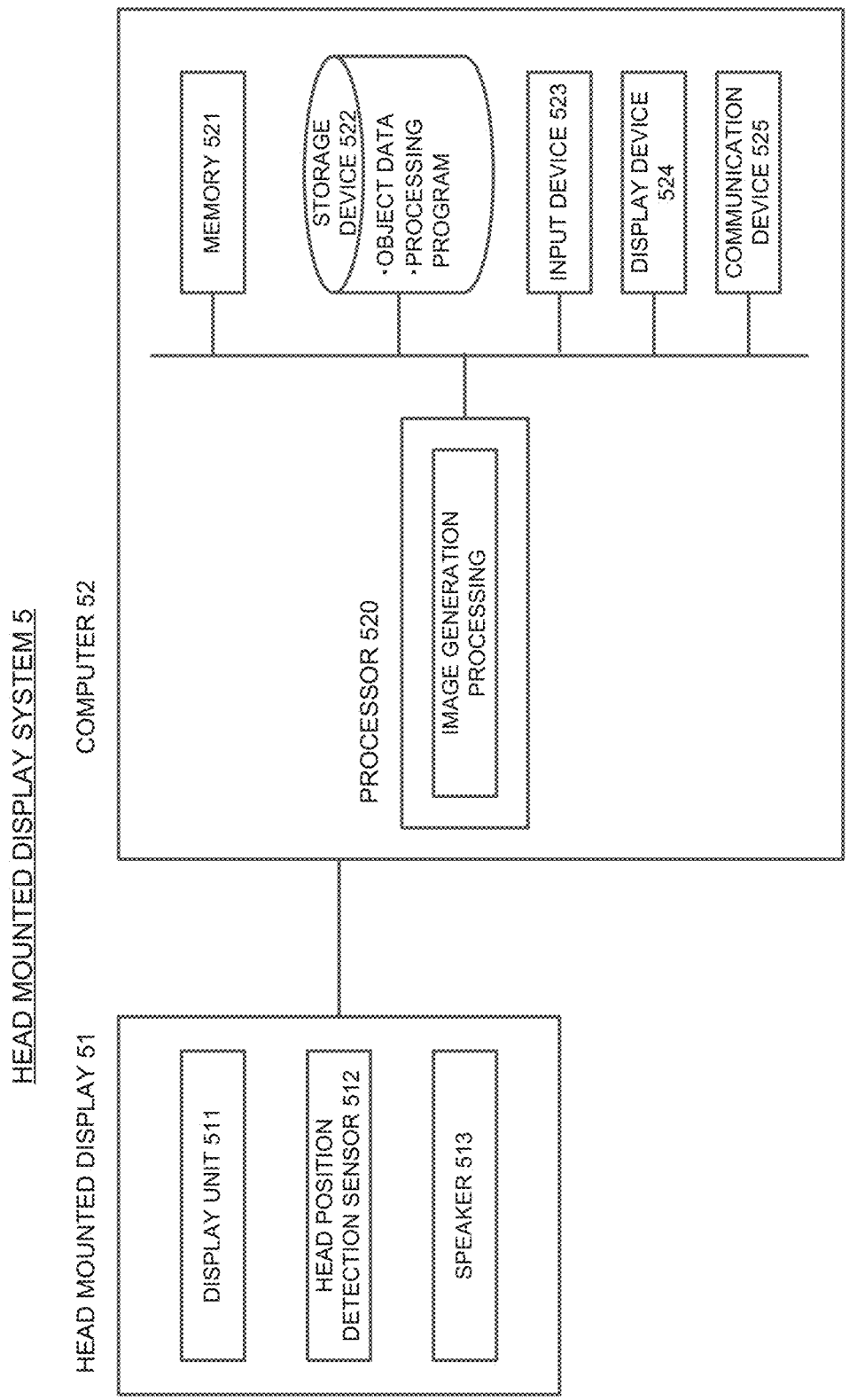
FIG. 7 is a block diagram of a head mounted display system 5.

FIG. 7 is a block diagram of the head mounted display system 5.

The head mounted display system 5 comprises a head mounted display 51 and a computer 52.

The head mounted display 51 comprises a display unit 511 by which a video of a virtual space is displayed, a head position detection sensor 512, and a speaker 513.

The head position detection sensor 512 is configured to detect a position and a posture of a user's head in an absolute coordinate system of the user's head and output a detection signal thereof to the computer 52. Because the head position detection sensor 512 is formed into one piece with the head mounted display 51, the head mounted display 51 can trace, by being mounted on the user's head, a motion of the user's head to thereby detect the position and the posture of the user's head. Then, the detection result is fed back to the 3-dimensional video of the virtual space displayed by the display unit 511 of the head mounted display 51. As a result, the display unit 511 can provide a three-dimensional video viewed from a viewpoint position in accordance with the motion of the user's head.

The speaker 513 outputs sound to the user, e.g., outputs sound in accordance with a situation in the virtual space to the user. Means for transmitting sound to the user is not limited to the speaker 513 but may be another sound output means such as an earpiece.

Examples of the head mounted display 51 having such function include HTC Vive and Oculus Rift manufactured by Oculus VR, Inc. The head position detection sensor 512 may be configured separately from the head mounted display 51 so as to be mountable to the user's head.

The computer 52 performs all sorts of arithmetic processing and generation of a video, etc. that is to be displayed on the display unit 511 of the head mounted display 51. The computer 52 can be composed of a general purpose computer that comprises hardware resources such as a processor 520, a memory (ROM, RAM) 521, a storage device (hard disk, semiconductor disk, etc.) 522, an input device (keyboard, mouse, touch panel, etc.) 523, a display device 524, and a communication device 525.

The storage device 522 stores a processing program and the like that performs all sorts of arithmetic processing and generation of a video, etc. to be displayed on the display unit 511 of the head mounted display 51. The storage device 522 further stores various kinds of object data for causing the processor 520 to generate a virtual athlete (virtual moving body) of the athlete 1, a virtual ball (virtual flying object) thrown by the virtual athlete, a virtual home base as a background, etc. that are arranged in the virtual space.

The program, the object data, and the received three-dimensional display data that are stored in the storage device 522 are loaded into the memory 521. Then, the processor 520 generates, based on the program, a video, etc. of the virtual space that the display unit 511 of the head mounted display 51 displays.

The processor 520 performs image generation processing based on the program. The image generation processing sequentially generates, according to a publicly known computer graphic technology, 3-dimensional video of a motion of the virtual athlete and a flight video of the virtual ball by using three-dimensional display data of the virtual ball (virtual flying object) thrown by the virtual athlete (virtual moving body), a position and a posture of the user's head that the head position detection sensor 512 detected, and all sorts of object data of the virtual athlete (virtual moving body) and the virtual ball (virtual flying object), followed by displaying the same on the display unit 511. At this time, if timing information is contained in the three-dimensional display data, the image generation processing specifies a displayable period based on time information contained in the timing information and a time code of the video and causes the display unit 511 to display, only for the period, a three-dimensional video such as a flight video, etc. of a virtual ball.

Figure 8:
FIG. 8 shows an example of a three-dimensional video displayed on a display unit 511.

For example, during a broadcast video section displaying a notice to the effect that the best pitch of a pitcher A can be experienced, the processor 520 causes the display unit 511 to display a pitching motion of the pitcher in the form of a virtual moving body based on the object data and further causes the display unit 511 to display the flight video of the virtual ball (virtual flying object) thrown by the pitcher as the virtual moving body by using three-dimensional display data containing release point coordinates, acceleration (curving force of a ball), air resistance against the ball, and an initial velocity vector. FIG. 8 shows an example of the three-dimensional video that is displayed on the display unit 511. In the three-dimensional video as shown in FIG. 8, a virtual pitcher viewed from a viewpoint position, in a virtual space, corresponding to a position and a posture of the user, a flight video of a virtual ball, a virtual stadium, etc. are displayed.

In a case where three-dimensional display data identification information is contained in the three-dimensional display data and a three-dimensional video such as a flight video, etc. of a virtual ball is displayed based on execution information to be delivered, such processing is started that, in response to a reception of the execution information, the three-dimensional video of a flight video, etc. of a virtual ball is displayed by using the three-dimensional display data that is specified by the three-dimensional display data identification information contained in the execution information.

The above described head mounted display system 5 is a mere example and thus is not limited thereto. For example, the head mounted display includes a Virtual Reality (VR) type head mounted display that displays only a virtual space created by computer graphics and the like and a Mixed Reality (MR) type head mounted display that displays a reality space (e.g., an optically transmissively displayed reality space) and a virtual space concurrently in real time. The present invention can be applied to the both head mounted displays. For example, HoloLens manufactured by Microsoft Corporation is one of the MR type head mounted display.

In the above description about the head mounted display system 5, a case where the head mounted display 51 and the computer 52 are physically separately housed is exemplified but the configuration of the head mounted display system 5 is not limited thereto. The head mounted display system 5 may be configured in such a manner that the head mounted display 51 and the computer 52 are formed into one piece. An example of the head mounted display system 5 having such a configuration that the head mounted display 51 and the computer 52 are formed into one piece includes the above described HoloLens manufactured by Microsoft Corporation.

The head mounted display system 5 is not necessarily a dedicated head mounted display system. For example, a function equivalent to the head mounted display can be achieved if a smartphone is used by being mounted to a goggle type headset. An example thereof includes Galacy Gear VR manufactured by Samsung Electronics Co., Ltd.

Figure 9:
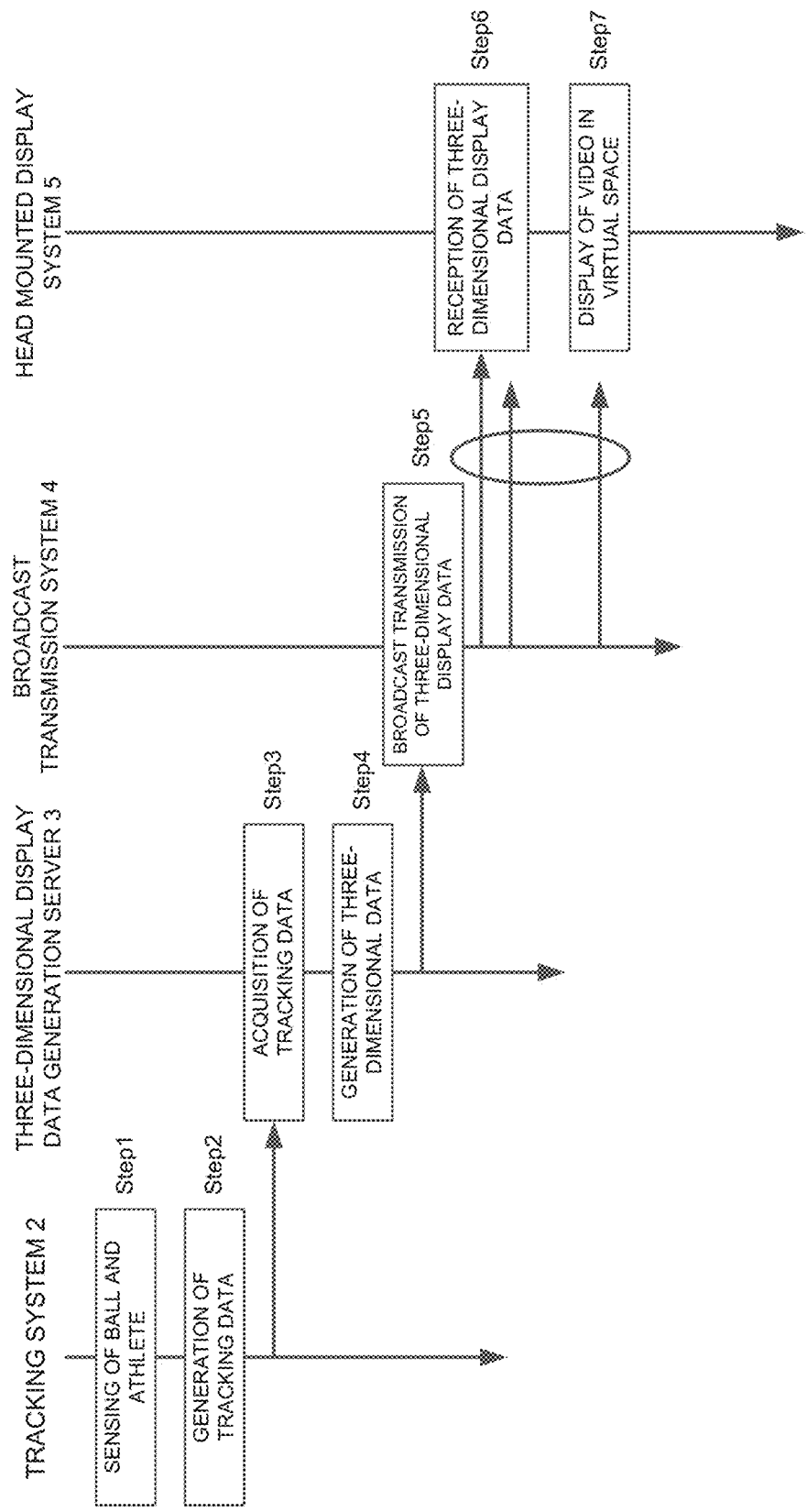
FIG. 9 is a sequence chart illustrating a flow of processing and information from a tracking system 2 to the head mounted display system 5 according to the first embodiment.

Now, a motion of the present embodiment will be described below. FIG. 9 is a sequence chart illustrating a flow of processing and information from the tracking system 2 to the head mounted display system 5 according to the first embodiment.

The tracking system 2 senses a ball thrown by the athlete 1 (pitcher) on the mound in the game on air, in real time, by means of radar, camera, etc. Here, the tracking system 2 may also sense the athlete 1, an umpire, etc. on the mound, in real time, by means of radar, camera, etc. (Step 1). The tracking system 2 generates, based on the sensed data, at least tracking data of a ball thrown by the athlete 1 (pitcher). Here, the tracking system 2 may generate also tracking data of the athlete 1, the umpire, etc. on the mound (Step 2). Concurrently, the tracking system 2 acquires time information of the tracking data. The tracking data containing time information is transmitted to the three-dimensional-display-data generation server 3.

The three-dimensional-display-data generation server 3 acquires the tracking data (Step 3). The three-dimensional-display-data generation server 3 generates, based on the acquired tracking data, three-dimensional display data for displaying a flight video of a virtual ball on the head mounted display system 5. The three-dimensional-display-data generation server 3 may generate also three-dimensional display data for displaying a virtual athlete (Step 4). At the time, timing information that is used as an acquisition time of the tracking data and displays a flight video of a virtual ball is to be contained in the three-dimensional display data. Further, the acquisition time of tracking data may be contained in the generated three-dimensional display data. Then, the three-dimensional-display-data generation server 3 transmits the three-dimensional display data to the broadcast transmission system 4.

The broadcast transmission system 4 performs broadcast transmission of the received three-dimensional display data to a plurality of head mounted display systems 5 that are connected to a network (Step 5). The broadcast transmission of the three-dimensional display data is performed, when an acquisition time of tracking data is contained in the three-dimensional display data, from the one nearest to the information of a time code of a video that is to be on air via TV. This enables broadcast transmission of the three-dimensional display data following a TV broadcast of a game. As a result, a real time property at a certain level can be kept.

The head mounted display system 5 receives the three-dimensional display data (Step 6). The head mounted display system 5 specifies, if timing information is contained in the three-dimensional display data, a displayable period based on the time information contained in the timing information and the time code of the video and displays, in the period, a three-dimensional video (flight video) of a virtual ball viewed from a viewpoint position in accordance with the motion of the head of the user who is wearing the head mounted display system 5 (Step 7). Further, the head mounted display system 5 displays, if three-dimensional display data identification information is contained in the three-dimensional display data, at the timing when receiving the execution information containing the three-dimensional display data identification information, a three-dimensional video (flight video) of a virtual ball viewed from a viewpoint position in accordance with the motion of the head of the user who is wearing the head mounted display system 5 (Step 7). Here, a virtual pitcher (virtual athlete) who throws a virtual ball may be displayed by using object data of the virtual pitcher that is preliminary stored in the head mounted display system 5, or the virtual pitcher may be displayed, if display data of a real pitcher is stored in the three-dimensional display data, by using the same.

The first embodiment performs broadcast transmission of information of motions of an athlete, a ball, etc. to the head mounted display system while keeping synchronism of a certain level with a game video, etc. of the sports, etc. delivered. Accordingly, the user can experience the performance of the athlete from the free visual point of the user himself by using the head mounted display system, in addition to just watching the performance of the athlete from the video.

It is not essential to generate and transmit the three-dimensional display data of all the tracking data. The first embodiment may be configured, even the scenes capable of being experienced is limited, to generate the tree-dimensional display data of only a limited athlete (e.g., only a pitcher) and a flying object (e.g., only a ball thrown by the pitcher) to perform broadcast transmission thereof. The three-dimensional display data of the tracking data is not necessarily be generated or transmitted throughout the game. The first embodiment may be configured to generate three-dimensional display data of the tracking data for a partial period of the game and generate, only for that period, the three-dimensional display data for the broadcast transmission.

Modification Example of First Embodiment

Figure 10:
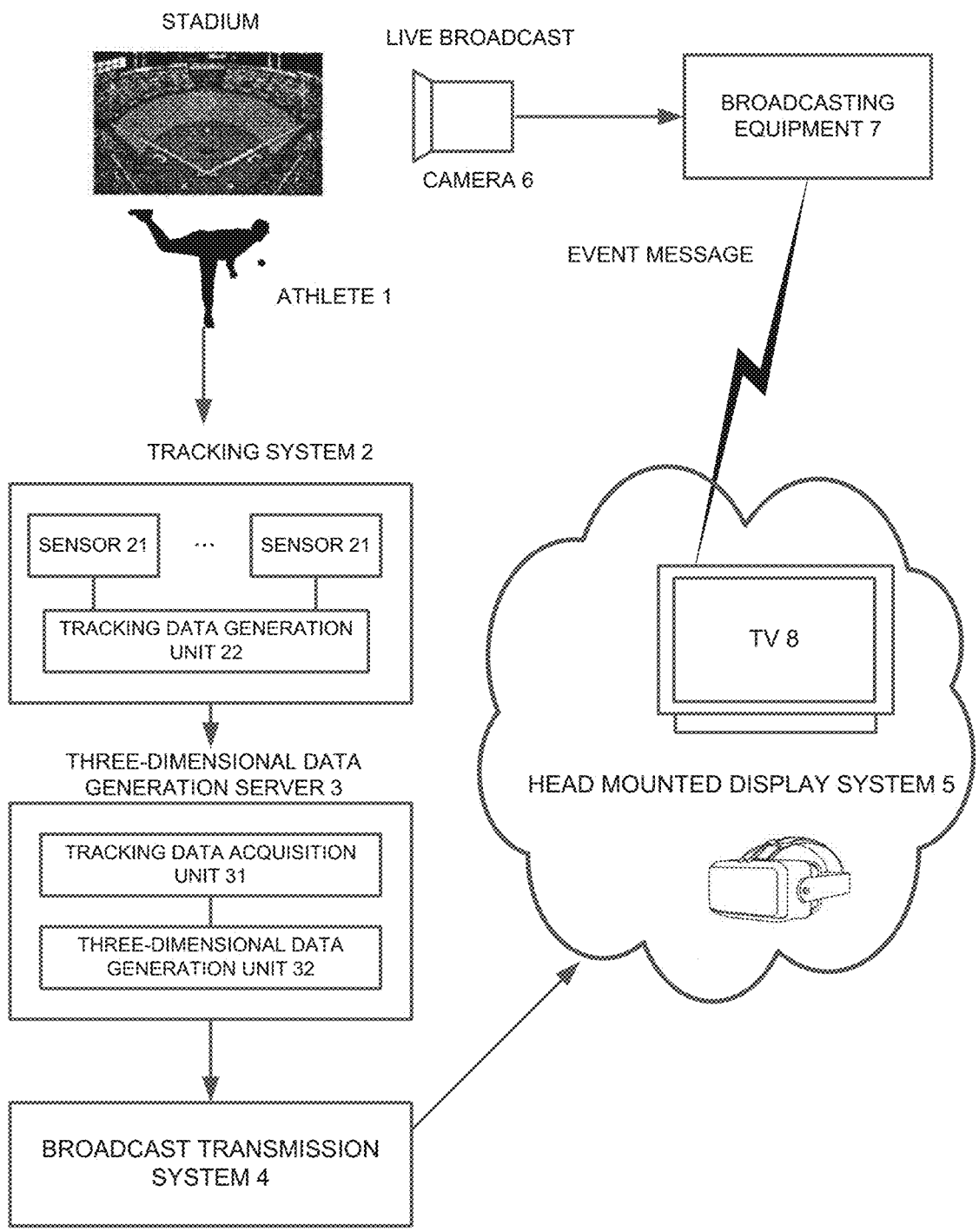
FIG. 10 is a schematic block diagram of a virtual-reality provision system according to a modification example of the first embodiment.

A modification example of the first embodiment will be described below. In the modification example of the first embodiment, a case where a hybridcast is employed as means for transmitting three-dimensional display data will be exemplified. FIG. 10 is a schematic block diagram of a virtual-reality provision system according to the modification example of the first embodiment.

If a head mounted display system 5 and a TV 8 conform to the Hybridcast standard, the head mounted display system 5 should be connected to the TV 8 via to the Hybridcast standard. If a broadcasting program is program-interlocking type broadcast via the Hybridcast, the broadcast transmission system 4 functions as a hybridcast server. Then, prior to a designated timing that is designated by a broadcast station, the broadcast transmission system 4 transmits to the head mounted display system 5 the three-dimensional display data of a virtual flying object (virtual ball), etc. that is obtained from the three-dimensional-display-data generation server 3, after the three-dimensional display data identification information capable of uniquely identifying three-dimensional display data is contained in the three-dimensional display data. Here, the three-dimensional display data identification information may be any information so far as it can identify the various types of three-dimensional display data from one another. Examples of the three-dimensional display data identification information include the above described acquisition time of tracking data and an identifier that identifies the three-dimensional display data individually.

The broadcasting equipment 7 broadcasts, at the timing when the virtual reality is executed in the head mounted display system 5, an event message that stores the three-dimensional display data identification information for identifying the three-dimensional display data to be used when executing the virtual reality. Here, the three-dimensional display data identification information is, for example, the above described acquisition time of tracking data and the identifier that identifies the three-dimensional display data individually.

The TV 8 detects and analyzes the event message that was broadcasted by the broadcasting equipment 7 to transmit the three-dimensional display data identification information stored in the event message to the head mounted display system 5. An image generation processing unit 520 of the head mounted display system 5 uses the three-dimensional display data having the three-dimensional display data identification information, delivered from the TV 8, among the three-dimensional display data received, to sequentially generate a motion of a virtual athlete and a three-dimensional video of a flight video of a virtual ball, in a manner as it was done in the above described first embodiment. Then, the generated three-dimensional video is displayed on the display unit 511.

Figure 11:
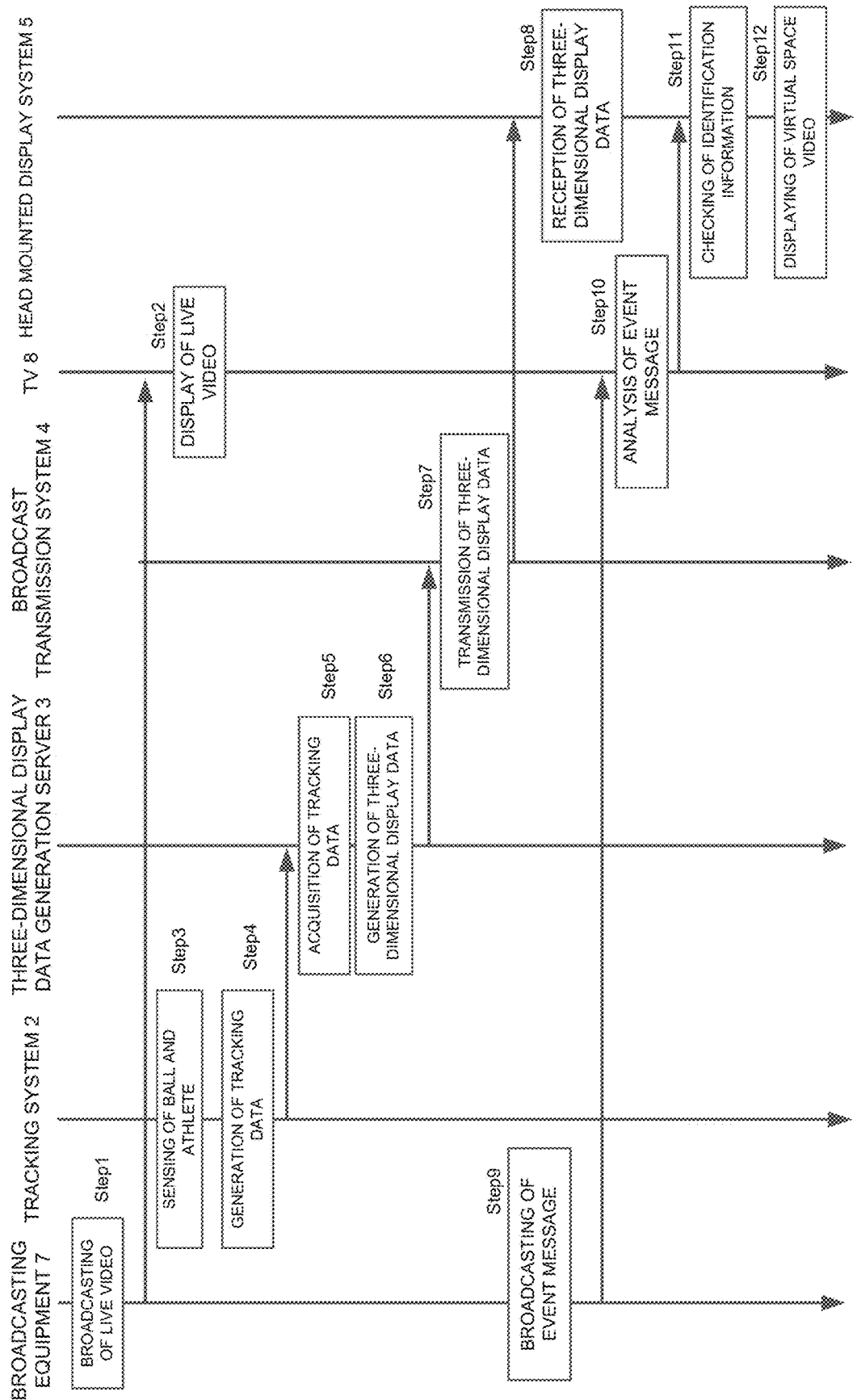
FIG. 11 is a sequence chart illustrating a flow of processing and information from broadcasting equipment 7 to a head mounted display system 5 according to a modification example of the first embodiment.

Now, a motion of the modification example of the first embodiment will be described below. FIG. 11 is a sequence chart illustrating a flow of processing and information from the broadcasting equipment 7 to the head mounted display system 5 in the modification example of the first embodiment.

The broadcasting equipment 7 broadcasts a live video of a game on air (Step 1).

The TV 8 receives broadcast wave to display it as a live video (Step 2).

The tracking system 2 senses, in real time, a ball thrown by the athlete 1 (pitcher) on the mound in the live game by means of a radar, a camera, etc. The tracking system 2 may sense, in real time, also the athlete 1, an umpire, etc. on the mound by means of the radar, the camera, etc. (Step 3). The tracking system 2 generates, based on the sensed data, at least tracking data of the ball thrown by the athlete 1 (pitcher). The tracking system 2 may generate also tracking data of the athlete 1, the umpire, etc. on the mound (Step 4). Thereafter the tracking data is transmitted to the three-dimensional-display-data generation server 3.

The three-dimensional-display-data generation server 3 acquires the tracking data (Step 5). The three-dimensional-display-data generation server 3 generates, based on the acquired tracking data, three-dimensional display data for displaying a flight video of a virtual ball on the head mounted display system 5 (Step 6). The three-dimensional-display-data generation server 3 may generate also three-dimensional display data for displaying a virtual athlete (Step 4). At the time, a three-dimensional display data identifier that identifies three-dimensional display data is to be contained in the generated three-dimensional display data. Thereafter the three-dimensional display data is transmitted to the broadcast transmission system 4. By the way, the three-dimensional display data identifier used herein is the one that is shared with the broadcasting equipment 7.

The broadcast transmission system 4 transmits the received three-dimensional display data to the head mounted display system 5 via a hybridcast (Step 7).

The head mounted display system 5 receives the three-dimensional display data (Step 8).

The broadcasting equipment 7 broadcasts an event message in which the three-dimensional display data identifier is stored at the timing of executing a virtual reality in the head mounted display system 5 (Step 9).

The TV 8 detects and analyzes the event message that is broadcasted by the broadcasting equipment 7 to transmit the three-dimensional display data identifier to the head mounted display system 5 (Step 10).

The head mounted display system 5 checks the three-dimensional display data identifier that was received from the TV 8 against the three-dimensional display data identifier of the three-dimensional display data that has been received (Step 11). Thereafter the head mounted display system 5 displays, by using the three-dimensional display data having the three-dimensional display data identifier that has been received from the TV 8, an three-dimensional video (flight video) of the virtual ball viewed from a viewpoint position in accordance with the motion of the head of the user who is wearing the head mounted display system 5 (Step 12). Here, a virtual pitcher (virtual athlete) who throws the virtual ball may be displayed by using the object data of the virtual pitcher that is preliminary stored in the head mounted display system 5 or, if display data of a real pitcher is stored in the three-dimensional display data, the virtual pitcher may be displayed by using the same.

As is the case with the first embodiment, it is not essential to generate and transmit three-dimensional display data of all the tracking data. Even the scenes that the user can experience is limited, the tree-dimensional display data of only a limited athlete (e.g., only a pitcher) and a flying object (e.g., only a ball thrown by the pitcher) may be generated to be subjected to broadcast transmission. Similarly, the three-dimensional display data of the tracking data is not necessarily be generated or transmitted throughout the game. The broadcast station side may generate three-dimensional display data of tracking data for a predetermined athlete and a part of a time period of the game and may perform generation and broadcast-transfer of the three-dimensional display data only for the athlete and the time period. Then, the broadcast station side may broadcast an event message that contains three-dimensional display data identification information corresponding thereto.

With such a configuration, a timing for executing a virtual reality can be designated, as a program-interlocking type service, from the broadcast station side to the head mounted display system 5 and thus a virtual reality that interlocks with a program video of a sport game, etc. to be on air can be provided by the head mounted display system 5.

Second Embodiment

Figure 12:
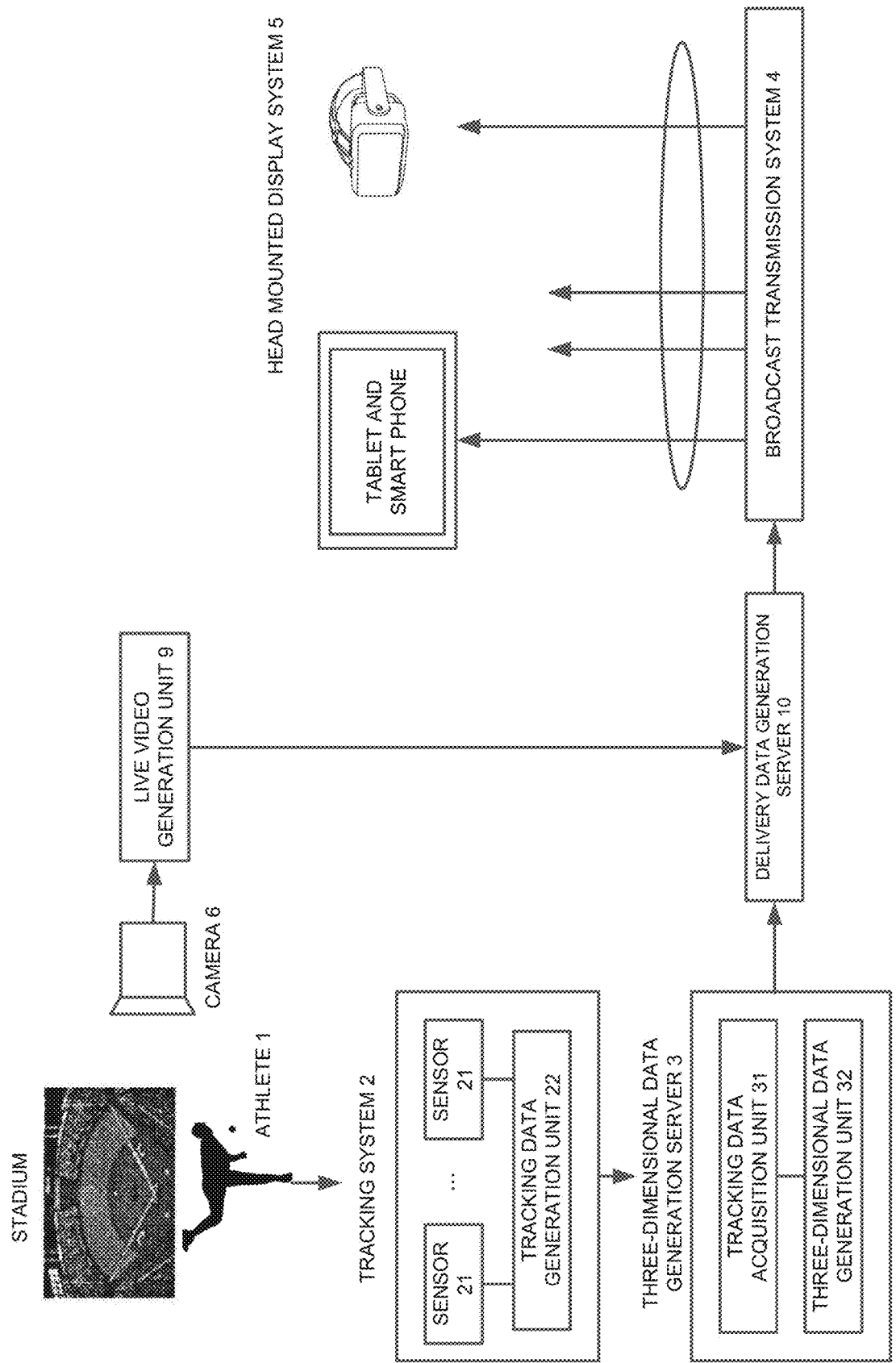
FIG. 12 is a schematic block diagram of a virtual-reality provision system according to a second embodiment.

A second embodiment will be described exemplifying a case where three-dimensional display data of tracking data is transmitted together with a game video that is to be live distribution via a content delivery network (CDN). FIG. 12 is a schematic block diagram illustrating a virtual-reality provision system according to the second embodiment.

According to the second embodiment, in comparison with the first embodiment, a baseball game video captured by a camera 6 is subjected not to TV broadcast but to broadcast transmission to a terminal of a tablet, a smartphone, etc. via the content delivery network system. The second embodiment differs from the first embodiment in that the three-dimensional display data is transmitted together with game video data that is to be transmitted.

The second embodiment comprises a live video generation unit 9 that generates video data of a live video of a game and a delivery data generation server 10 that generates delivery data in which three-dimensional display data is contained in the video data of the live video of the game. Elements having configurations likewise those of the first embodiment will be given the same reference numbers.

Figure 13:
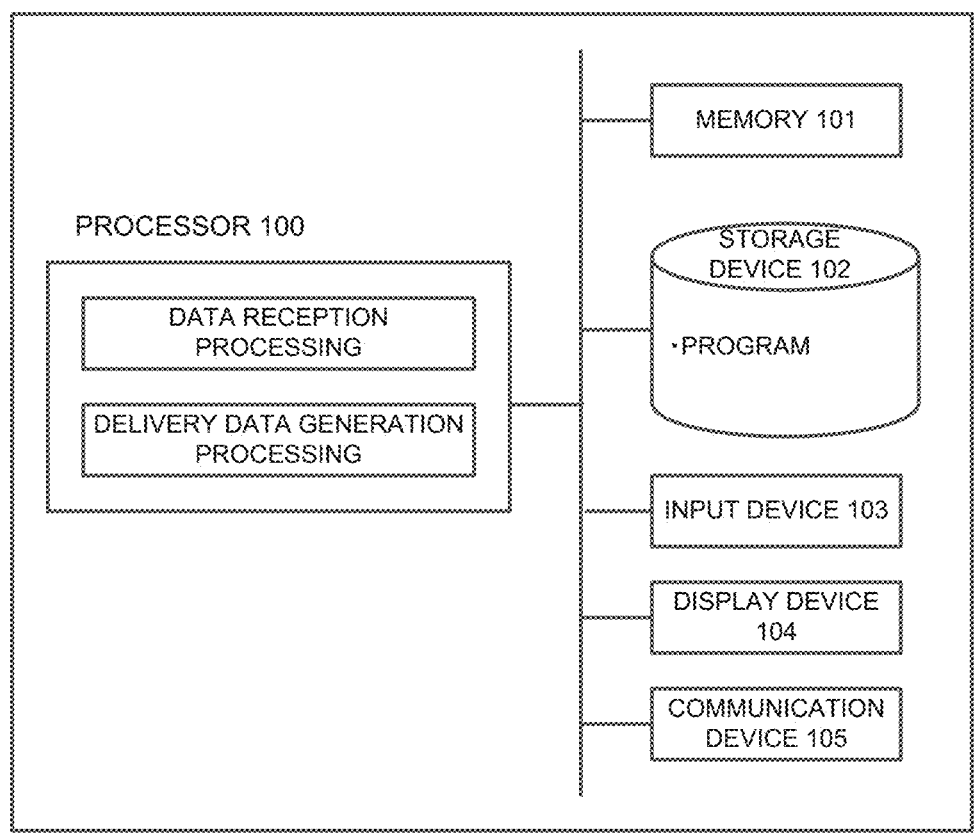
FIG. 13 is a block diagram of a delivery data generation server 10 composed of a computer system.

The delivery data generation server 10 can be achieved, specifically, by a computer system having a processor that performs all sorts of arithmetic processing. FIG. 13 is a block diagram of the delivery data generation server 10 that is composed of a computer system.

The delivery data generation server 10 can be composed of a general purpose computer that comprises hardware resources such as a processor 100, a memory (ROM, RAM) 101, a storage device (hard disk, semiconductor disk, etc.) 102, an input device (keyboard, mouse, touch panel, etc.) 103, a display device 104, and a communication device 105.

The delivery data generation server 10 achieves delivery data generation processing in such a manner that a program that is stored in the storage device 102 is loaded into the memory 101 to be executed by the processor 100.

The processor 100 performs reception processing of receiving live video data and three-dimensional display data and delivery data generation processing of generating delivery data.

The delivery data generation processing generates delivery data in such a manner that the live video data and the three-dimensional display data can be separated on a side of the head mounted display system 5. For example, the delivery data is generated in such a manner that a header of a packet of the video data is given an identifier that identifies the video data, and a header of a packet of the three-dimensional display data is given an identifier that identifies the three-dimensional display data. On the side of the head mounted display system 5, the identifier enables separation of the video data from the three-dimensional display data. If there is a field in which data other than the video data can be contained, in payload of individual packet of the video data, the identifier may be inserted into the field in such a manner that the three-dimensional display data can be identified.

The delivery data generation processing generates delivery data, by referring to a time code of the video data and an acquisition time of tracking data that is contained in the three-dimensional display data, in such a manner that the both synchronize each other.

If there is a field in which data other than the video data can be contained, in payload of each packet of the video data, three-dimensional display data having an acquisition time of tracking data that is identical to an acquisition time of a time code of the packet is inserted into the field. This is a mere example and another way is also employable.

The delivery data generation server 10 transmits the generated delivery data to the broadcast transmission system 4.

The broadcast transmission system 4 performs broadcast transmission to the head mounted display system 5 and a tablet and a smartphone for watching video.

Figure 14:
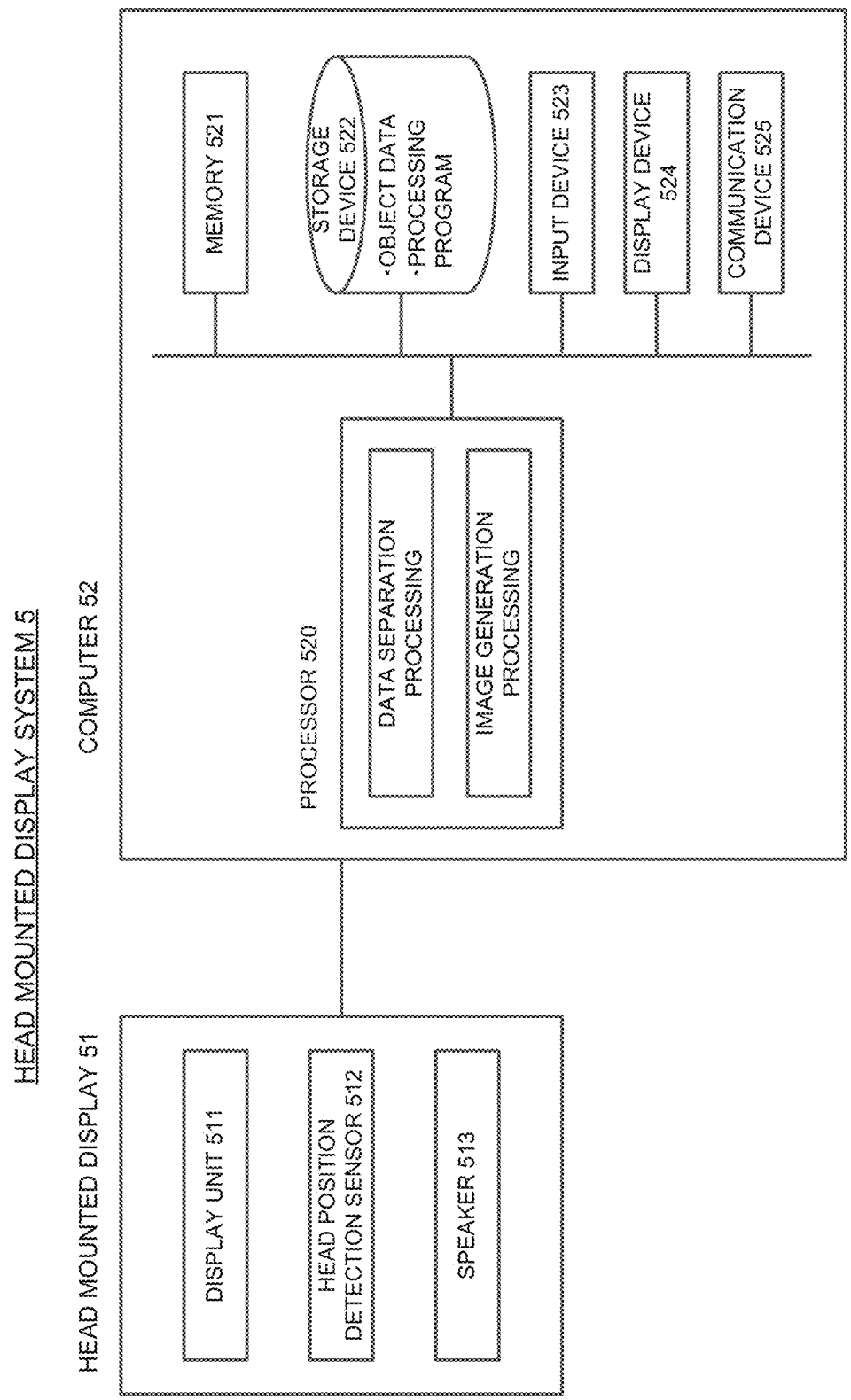
FIG. 14 is a block diagram of a head mounted display system 5 according to the second embodiment.

FIG. 14 is a block diagram of the head mounted display system 5 according to the second embodiment.

The head mounted display system 5 performs data separation processing, according to a predetermined separation method, to separate video data from three-dimensional display data by means of a processor 520. More specifically, if an identifier that identifies a type of the respective data is given to a packet, the head mounted display system 5 separates, based on the identifier, the video data from the three-dimensional display data. Further, if three-dimensional display data is contained, together with the identifier, in the payload of each packet of the video data, the head mounted display system 5 separates, based on the identifier, the video data from the three-dimensional display data.

The image generation processing causes the display unit to display a three-dimensional video of the virtual space likewise the first embodiment.

If the head mounted display system 5 is a system capable of viewing also distributed video data, such a configuration may be possible that the user can select either one of a live video and a three-dimensional video of a virtual space.

Figure 15:
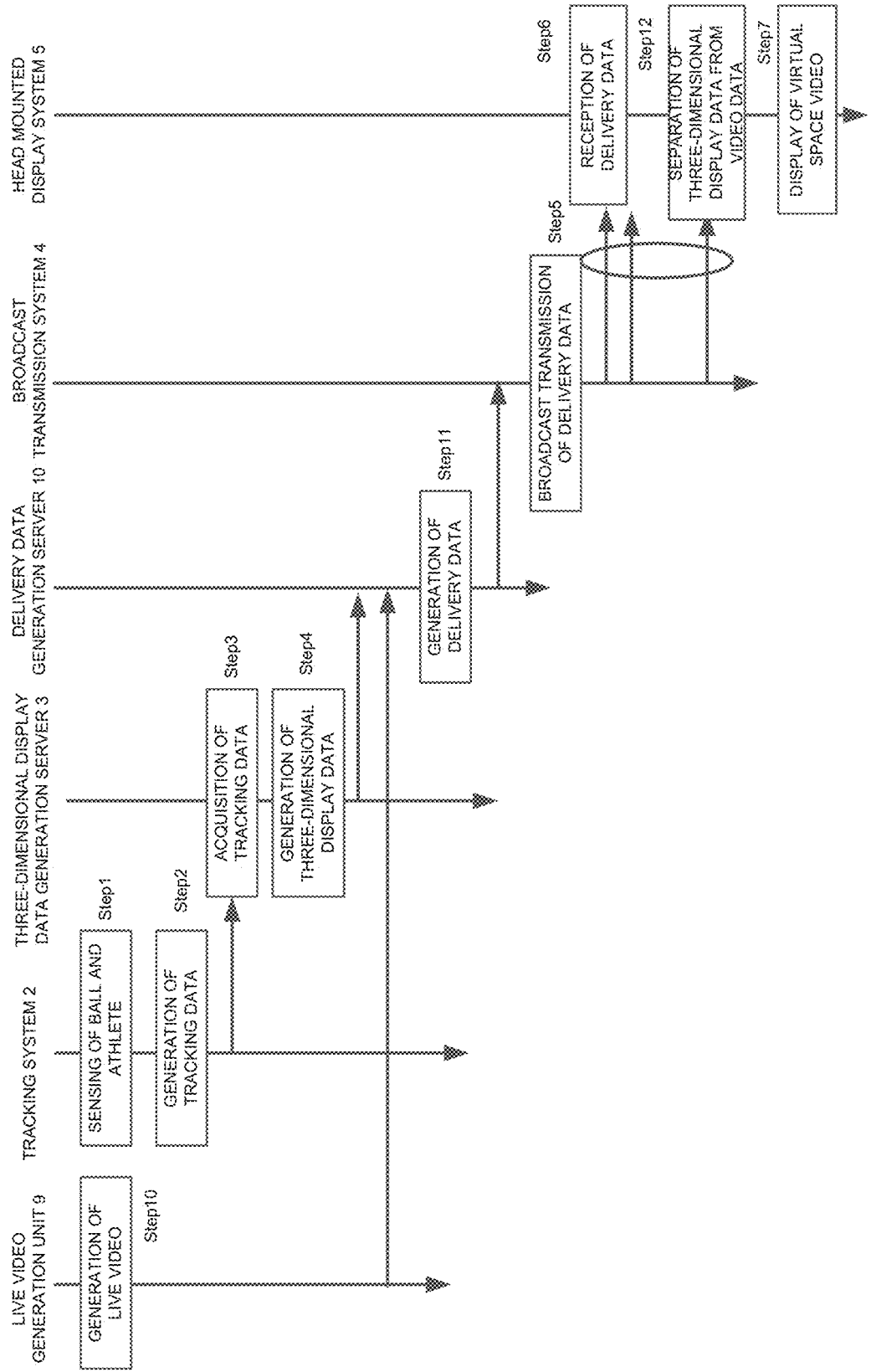
FIG. 15 is a sequence chart illustrating a flow of processing and information from a live video generation unit 9 to the head mounted display system 5 according to the second embodiment.

Now, a motion of the present embodiment will be described below. FIG. 15 is a sequence chart illustrating a flow of processing and information from the live video generation unit 9 to the head mounted display system 5 according to the second embodiment. Motions likewise those of the first embodiment will be given the same step numbers.

The live video generation unit 9 generates game video data on air (Step 1). The generated video data is transmitted to a delivery data generation server 10.

A tracking system 2 senses, in real time, a ball thrown by an athlete 1 (pitcher) on the mound in a game on air by means of a radar, a camera etc. The tracking system 2 may sense the athlete 1, an umpire, etc. on the mound, in real time, by means of a radar, a camera, etc. (Step 1). The tracking system 2 generates at least tracking data of a ball thrown by the athlete 1 (pitcher) based on the sensed data. The tracking system 2 may generate also tracking data of the athlete 1, the umpire, etc. on the mound (Step 2). At the time, the tracking system 2 concurrently acquires time information of the tracking data. Then, the tracking data containing the time information is transmitted to the three-dimensional-display-data generation server 3.

The three-dimensional-display-data generation server 3 acquires tracking data (Step 3). The three-dimensional-display-data generation server 3 generates, based on the acquired tracking data, three-dimensional display data to display a flight video of a virtual ball on the head mounted display system 5 (Step 4). Because the three-dimensional-display-data generation server 3 may generate also three-dimensional display data for displaying a virtual athlete at this moment, an acquisition time of tracking data is to be contained in the generated three-dimensional display data. Then, the three-dimensional-display-data generation server 3 transmits the three-dimensional display data to the delivery data generation server 10.

The delivery data generation server 10 generates delivery data in such a manner that the three-dimensional display data is contained in video data of a live video of a game (Step 11). The generated delivery data is transmitted to the broadcast transmission system 4.

The broadcast transmission system 4 performs broadcast transmission of the received delivery data to a plurality of head mounted display system 5 and a tablet and a smartphone (not illustrated) that are connected to a network (Step 5).

The head mounted display system 5 receives the delivery data (Step 6). The head mounted display system 5 performs data separation processing, by a predetermined separation method, to separate the video data from the three-dimensional display data (Step 12). Then, the head mounted display system 5 displays a three-dimensional video (flight video) of a virtual ball viewed from a viewpoint position in accordance with a motion of the head of a user who is wearing the head mounted display system 5 (Step 7). At the time, a virtual pitcher (virtual athlete) who throws the virtual ball may be displayed by using object data of the virtual pitcher that is preliminary stored in the head mounted display system 5 or the virtual pitcher may be displayed, if display data of a real pitcher is stored in the three-dimensional display data, by using the same.

According to the second embodiment, synchronization between delivery of the three-dimensional display data and delivery of the live video can be made, dislike the TV broadcast, on the data delivery side. As a result, the user can experience the performance of the athlete at more synchronizing timing with the game currently played.

Modification Example of Second Embodiment

According to the second embodiment, the three-dimensional display data also can contain timing information likewise the first embodiment. Further, the acquisition time of the tracking data may not be contained in the three-dimensional display data but only timing information may be contained therein.

In this case, the delivery data generation server 10 generates delivery data in such a manner that, before the timing (predetermined video section) at which the three-dimensional video (flight video) specified by timing information is displayed, separation of the three-dimensional display data and the video data can be achieved on the side of the head mounted display system 5.

With the above described configuration, the second embodiment also can produce an effect equivalent to that of the first embodiment.

Such a configuration is also possible that the three-dimensional display data contains, instead of the timing information, three-dimensional display data identification information that can uniquely identify the three-dimensional display data and the resulting three-dimensional display data is transmitted to the head mounted display system 5.

In a case where the three-dimensional display data is configured to contain the three-dimensional display data identification information, execution information that contains the three-dimensional display data identification information for identifying the three-dimensional display data that is to be used in executing a virtual reality is to be transmitted, from the delivery data generation server 10, at the timing after the delivery of the three-dimensional display data containing the three-dimensional display data identification information and at the timing when a flight video of a virtual ball (virtual flying object) is displayed on the head mounted display system 5. The head mounted display system 5 receives the execution information and displays, by using the three-dimensional display data that is specified by the three-dimensional display data identification information in the instruction information, the flight video of the virtual ball (virtual flying object) on the head mounted display system 5.

With the above described configuration, the second embodiment also can produce an effect equivalent to that of the first embodiment.

Third Embodiment

A third embodiment is configured, in addition to the configurations of the first embodiment (including the modification example of the first embodiment) or the second embodiment (including the modification example of the second embodiment), to provide experience of hitting and catching of a flying object (e.g., ball) that is reproduced based on tracking data obtained from a real athlete 1, if similar tools (e.g., bat, globe) that are used in a game are prepared on a user side.

Figure 16:
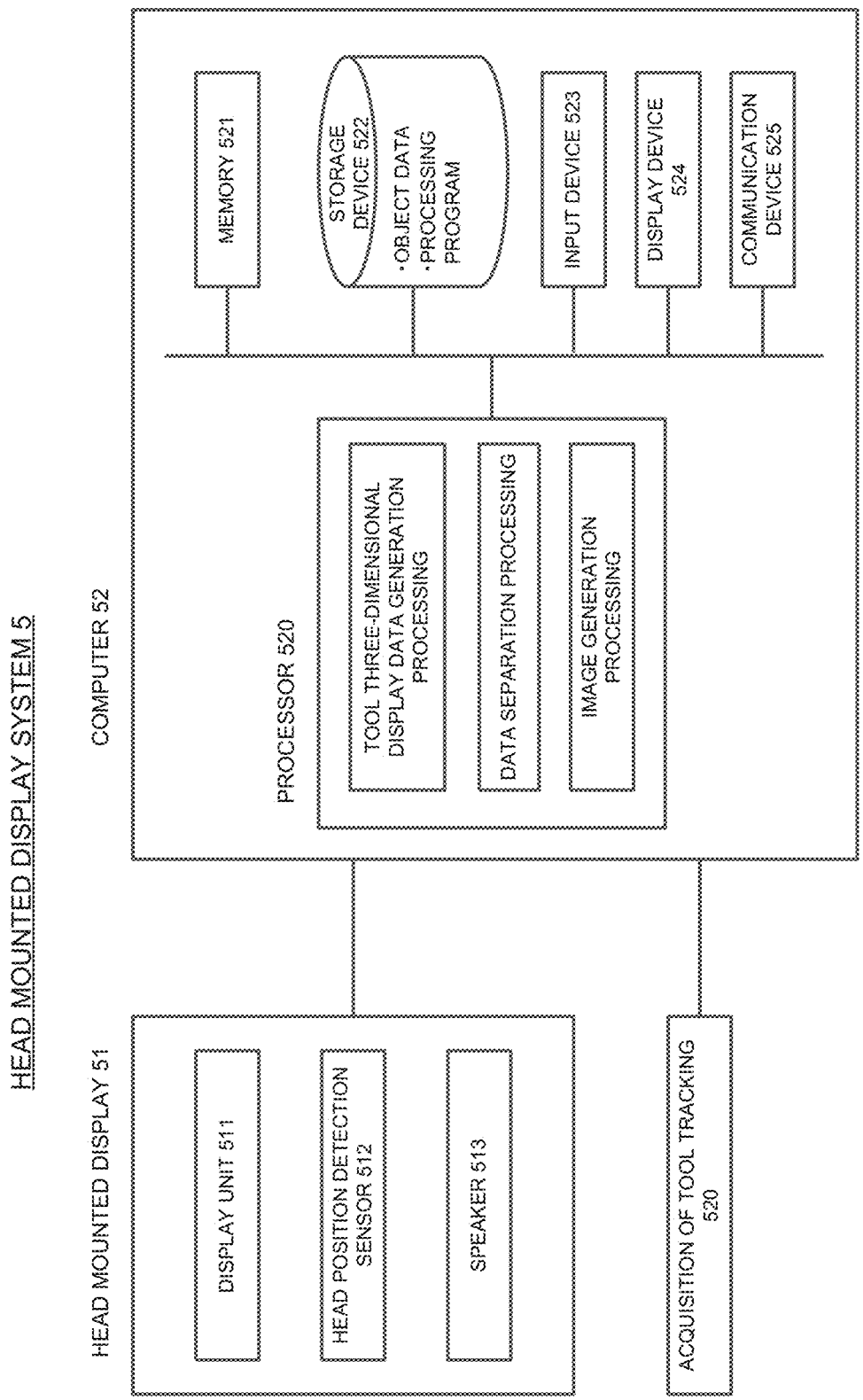
FIG. 16 is a block diagram of a head mounted display system 5 according to a third embodiment.

FIG. 16 is a block diagram of a head mounted display system 5 according to the third embodiment.

The third embodiment comprises a tool-tracking acquisition unit 520 that tracks a motion of a tool used by a user when the user wears the head mounted display 51. As the tool-tracking acquisition unit 520, Kinect (registered mark) manufactured by Microsoft Corporation, Xtion Pro (registered mark) manufactured by ASUS TeK Computer Inc., etc. can be used. Such a configuration is also employable that the tool provided with an acceleration sensor acquires tracking data of the tool.

In the head mounted display system 5, in addition to the motions of the first embodiment (including the modification example of the first embodiment) or the second embodiment (including the modification example of the second embodiment), the processor 520 of a computer 52 performs tool-three-dimensional-display data generation processing.

The tool-three-dimensional-display data generation processing calculates, based on the tool tracking data acquired by the tool-tracking acquisition unit 520, three-dimensional display data (trajectory data) of a virtual tool body corresponding to the tool. Further, the tool-three-dimensional-display data generation processing calculates, based on the three-dimensional display data (trajectory data) of a virtual flying object and the three-dimensional display data (trajectory data) of a virtual tool body, new three-dimensional display data (trajectory data) of a virtual flying object that is created by an impact between the virtual flying object and the virtual tool body in a virtual space.

Figure 17:
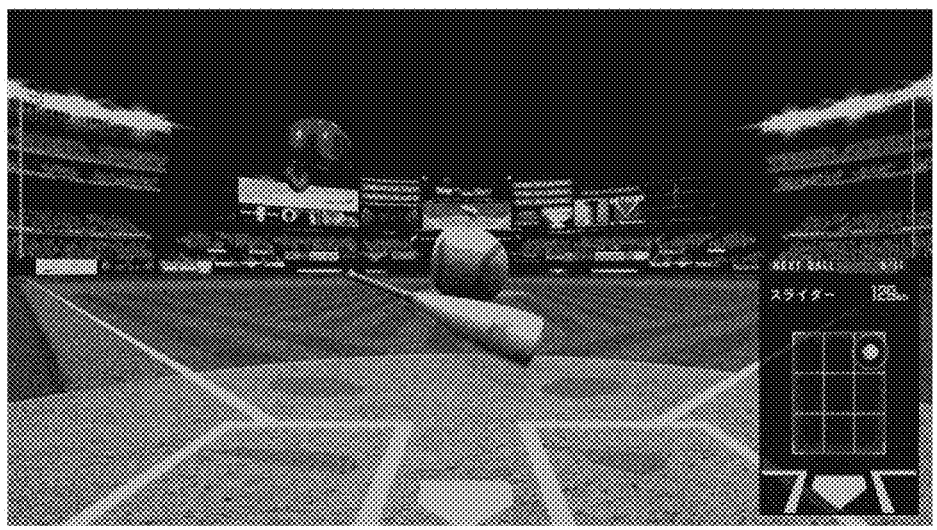
FIG. 17 shows an example of a video when there was an impact between a virtual ball and a virtual bat.
Figure 18:
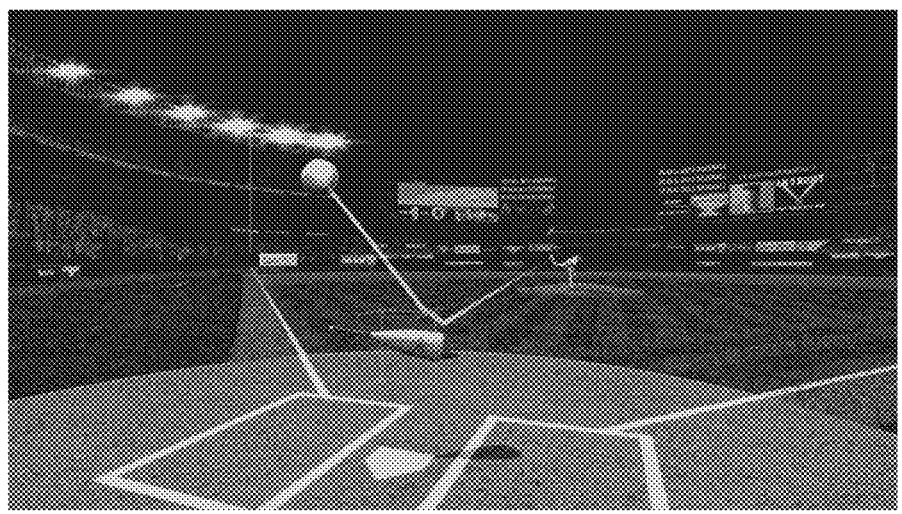
FIG. 18 shows an example of a trajectory video of a virtual ball after the impact between the virtual ball and the virtual bat.

More specifically, the tool-three-dimensional-display data generation processing calculates, in a case where the virtual flying object is a virtual ball and the virtual tool body is a virtual bat, if the user swings a bat in accordance with the flight video of the virtual ball thrown by the virtual athlete, three-dimensional display data (trajectory data) of the swing of the virtual bat based on tracking data of the bat. Then, the tool-three-dimensional-display data generation processing determines, based on the three-dimensional display data (trajectory data) of the virtual bat and the three-dimensional display data (trajectory data) of the virtual ball, if there will be an impact between the virtual bat and the virtual ball in the virtual space (determines if the virtual ball was hit by the virtual bat). When there was an impact therebetween, the tool-three-dimensional-display data generation processing generates, based on a size and a restitution coefficient of the virtual bat, three-dimensional display data (trajectory data) of a flying orbit of the virtual ball after the impact. Then, image generation processing generates, based on the three-dimensional display data (trajectory data) of the flying orbit of the virtual ball, a flight video of the virtual ball after the impact to display the same. FIG. 17 shows an example of a video when there was an impact between the virtual ball and the virtual bat. FIG. 18 shows an example of a flight video of the virtual ball after the impact between the virtual ball and the virtual bat.

Figure 19:
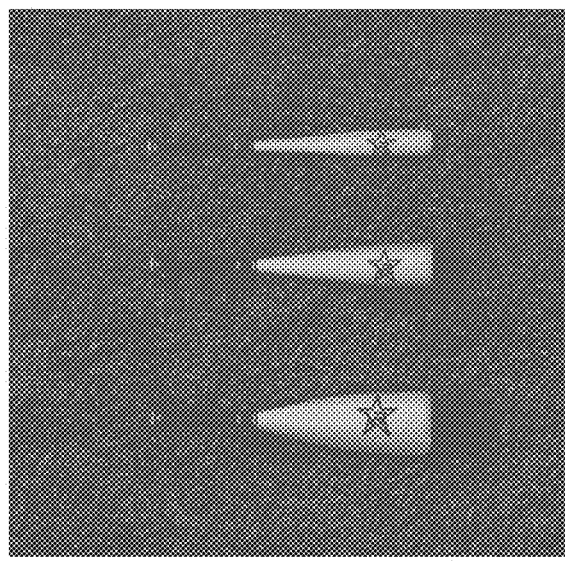
FIG. 19 shows a plurality of different examples of a virtual tool body.

Such a configuration is also employable that the user can select from a plurality of virtual tools having different sizes and different restitution coefficients, the virtual tools corresponding to the tool that the user uses. For example, when the tool is a bat, as shown in FIG. 19, such a configuration is also employable that a plurality of virtual bats having different sizes and different restitution coefficients are prepared to let the user select one therefrom. The above described configuration has such an advantage that, even in a case of a ball that cannot be hit with a normal tool, the user can hit a virtual ball more easily with a large virtual bat having a large restitution coefficient. Also, a flight distance of the virtual ball becomes longer. This enhances the amusement characteristics.

According to the third embodiment, the user can hit and catch a virtual flying object that is almost equivalent to a ball, etc. thrown by a real athlete in addition to viewing the performance of the athlete. That is, the user can challenge the performance of the athlete.

Fourth Embodiment

According to a fourth embodiment, in addition to the configuration of the third embodiment, an impact result if there was an impact between the virtual flying object and the virtual tool body and a flying result of the virtual flying object that can be obtained from new trajectory data of the virtual flying object are aggregated to reflect the aggregated result to a live video.

Figure 20:
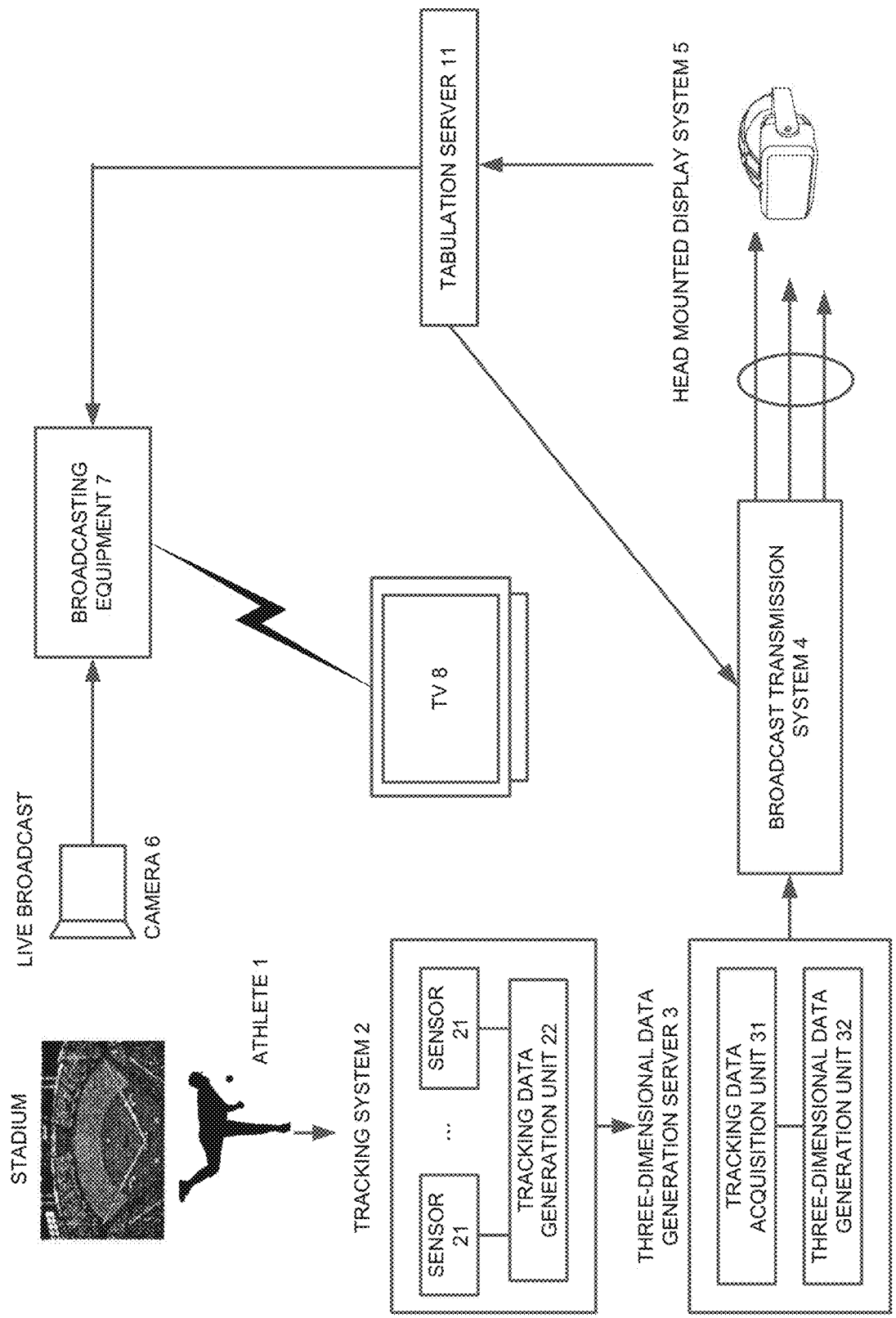
FIG. 20 is a schematic block diagram of a virtual-reality provision system according to a fourth embodiment.

FIG. 20 is a schematic block diagram of a virtual-reality provision system according to the fourth embodiment.

A computer 52 of a head mounted display system 5 determines if there was an impact between a virtual flying object and a virtual tool body. For example, the computer 52 determines if there was an impact between the virtual ball and the virtual bat, i.e., if the virtual bat could hit the virtual ball. If there was an impact between the virtual flying object and the virtual tool body, the computer 52 calculates a flying result of the virtual flying object. For example, the computer 52 calculates to determine if the batted virtual ball made a hit or a home run. Then, the computer 52 transmits the impact result and the flying result to a tabulation server 11. Further, the impact result and the flying result of each user are managed individually.

Figure 21:
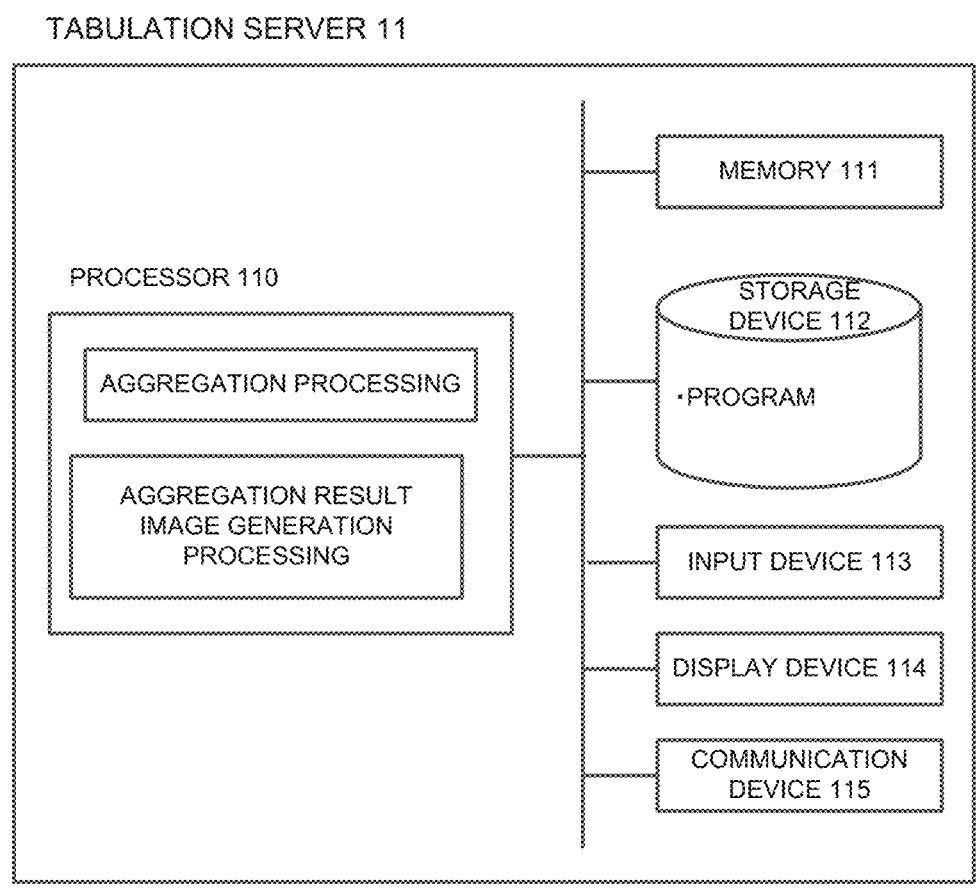
FIG. 21 is a block diagram of a tabulation server 11 composed of a computer system.

The tabulation server 11 can be achieved, specifically, by a computer system having a processor that performs all sorts of arithmetic processing. FIG. 21 is a block diagram illustrating the tabulation server 11 composed of a computer system.

The tabulation server 11 can be composed of a general purpose computer that comprises hardware resources such as a processor 110, a memory (ROM, RAM) 111, a storage device (hard disk, semiconductor disk, etc.) 112, an input device (keyboard, mouse, touch panel, etc.) 113, a display device 114, and a communication device 115.

The tabulation server 11 performs aggregate processing in such a manner that a program that is stored in the storage device 112 is loaded into the memory 111 to be executed by the processor 110. The aggregate processing aggregates the impact result and the flying result that are delivered from the corresponding head mounted display system 5. For example, the aggregate processing aggregates the number of head mounted display systems 5 that transmitted the impact result and the flying result, a ratio of impact result (impact) to the number of head mounted display systems 5, or a ratio of flying result to the number of head mounted display systems 5.

Figure 22:
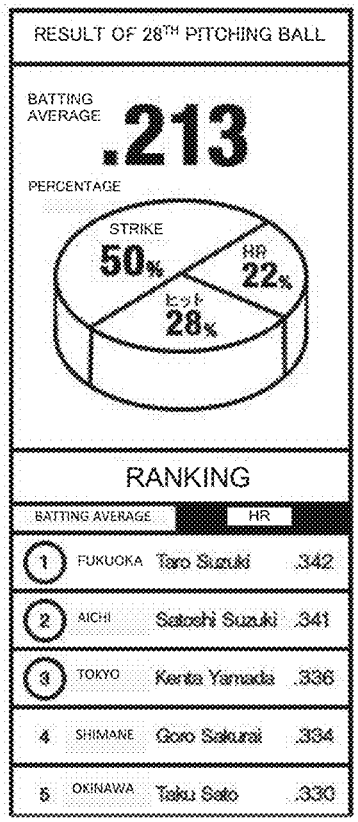
FIG. 22 is an example of an image of a statistical result when a virtual flying object is a ball and a virtual tool body is a bat.

Further, the tabulation server 11 performs aggregated-result-image generation processing that generates an aggregated result image as an image resulted from the aggregate result. FIG. 22 is an example of an image of a statistic result in a case where the virtual flying object is a ball and the virtual tool body is a bat.

The tabulation server 11 transmits the generated statistical image to broadcasting equipment or a broadcast transmission system.

Figure 23:
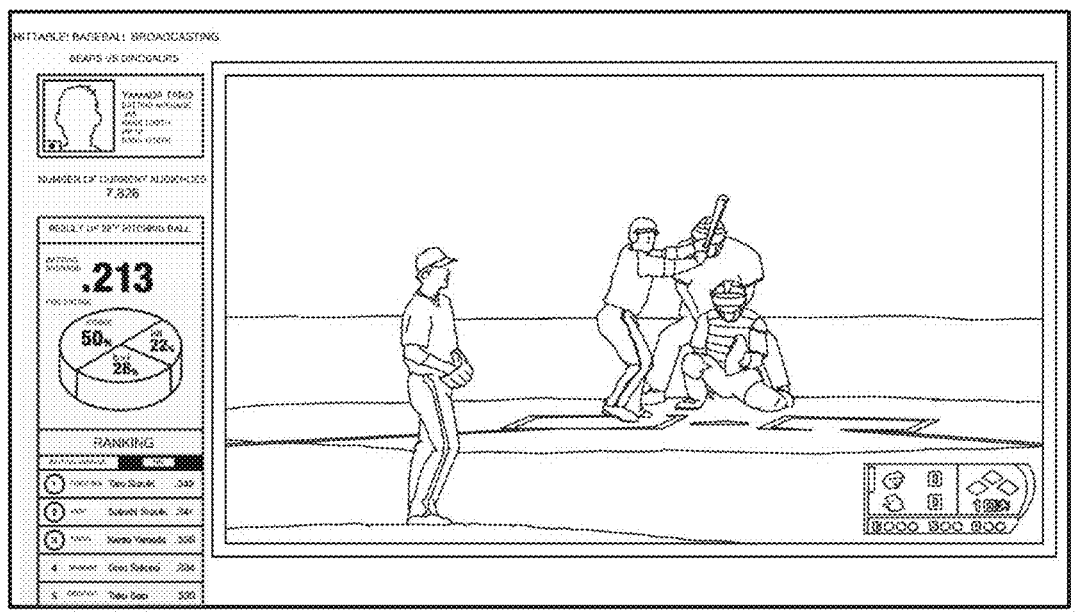
FIG. 23 is an example of a video made by synthesizing a live video with a statistical image.

In the broadcasting equipment or the broadcast transmission system, a live video is synthesized with the generated statistical image to be subjected to broadcast or broadcast transmission. FIG. 23 illustrates an example of a video in which the live video and the statistical image are synthesized together.

It is a matter of course that the configuration of the fourth embodiment can be applied not only to the broadcast of a live video but also to the transmission of a live video via a content delivery network system.

According to the fourth embodiment, because a score of the user who is wearing the head mounted display is reflected to the live video, such a brand new experience can be provided to the user that the user himself can take a leading role in addition to being a mere viewer of the live broadcasting.

Fifth Embodiment

A fifth embodiment comprises, in addition to the configurations of the first embodiment (including the modification example of the first embodiment) or the second embodiment (including the modification example of the second embodiment), a prediction server 12 that predicts a type of the next pitching ball thrown by an athlete 1, e.g., a pitcher, to a batter based on the performances in the past.

Figure 24:
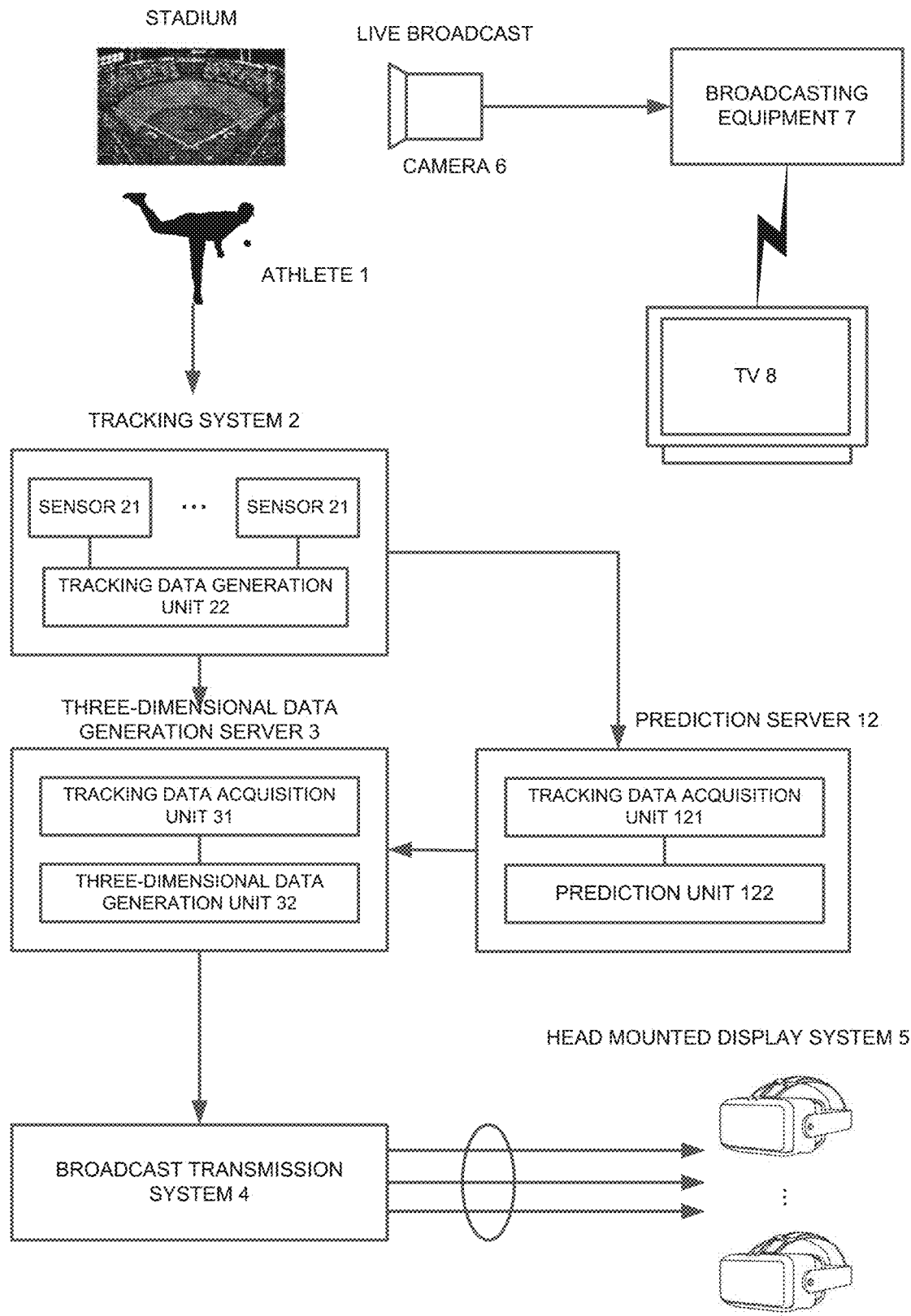
FIG. 24 is a schematic block diagram of a virtual-reality provision system according to a fifth embodiment.

FIG. 24 is a schematic block diagram of a virtual-reality provision system according to the fifth embodiment.

The prediction server 12 comprises a tracking data acquisition unit 121 and a prediction unit 122.

The tracking data acquisition unit 121 acquires tracking data provided from a tracking system 2. The tracking data to be acquired shall contain data that identifies a pitcher and a batter in game.

The prediction unit 122 performs machine learning about types of pitching balls that various pitchers have thrown to various batters in the past and inputs the acquired tracking data thereof, thereby predicting the type of the next pitching ball that the pitcher throws to the batter. The predicted type of pitching ball is transmitted to a three-dimensional-display-data generation server 3 in the form being the same as the tracking data.

The three-dimensional-display-data generation server 3 acquires tracking data from the prediction server 12. A three-dimensional-display-data generation unit 32 generates, in a manner similar to the above described embodiments, three-dimensional display data to display a flight video of a virtual ball of the predicted type of pitching ball, the flight video being displayed on a head mounted display system 5. Then, the generated three-dimensional display data is transmitted to at least one head mounted display system 5 via a broadcast transmission system 4.

According to the fifth embodiment, in addition to the configurations of the first embodiment (including the modification example of the first embodiment) or the second embodiment (including the modification example of the second embodiment), a user can experience a predicted type of pitching ball thrown next by the pitcher.

By the way, the fifth embodiment can be configured by a combination not only with the first embodiment (including the modification example of the first embodiment) but also with one or more of the second to the fourth embodiments.

A part of or all the above described embodiments can be described by, but not limited to, the following supplementary notes.

(Supplementary Note 1)

A virtual-reality provision system comprising:
at least one virtual-space provision system for providing a three-dimensional video of a virtual space to a user;

tracking data acquisition means for acquiring at least tracking data of a flying object thrown by a real athlete on the mound, the tracking data being obtained from a sensor;

three-dimensional coordinate data generation means for generating, based on the acquired tracking data, three-dimensional coordinate data to display a virtual flying object corresponding to the flying object in a virtual space displayed by the virtual-space provision system; and transmission means for transmitting, via broadcast transmission means, the three-dimensional coordinate data to the at least one virtual-space provision system.

(Supplementary Note 2)

The virtual-reality provision system according to supplementary note 1, wherein the tracking data contains tracking data of a motion of a real athlete on the mound; and wherein the three-dimensional coordinate data generation means generates, based on the acquired tracking data, three-dimensional coordinate data to display a virtual moving body corresponding to the real athlete in the virtual space displayed by the virtual-space provision system.

(Supplementary Note 3)

The virtual-reality provision system according to supplementary note 1 or supplementary note 2, comprising:

delivery data generation means for generating delivery, data that contains video data and the three-dimensional coordinate data of a real video of the athlete in game;

wherein the transmission means transmits, via the broadcast transmission means, the delivery data to the at least one virtual-space provision system; and wherein the virtual-space provision system comprises separation means for separating the video data and the three-dimensional coordinate data from the delivery data.

(Supplementary Note 4)

A virtual-reality provision system according to supplementary note 3, wherein the delivery data generation means generates the delivery data in such a manner that the video data of the real video synchronizes with the three-dimensional coordinate data corresponding to the real video.

(Supplementary Note 5)

The virtual-reality provision system according to any one of supplementary note 1 to supplementary note 4, the virtual-space provision system comprising:

storage means for storing object data of the virtual flying object and the virtual moving body and object data of a virtual tool body corresponding to a tool that the user handles;

reception means for receiving the three-dimensional coordinate data;

position and/or orientation detection means for detecting position data of the user and orientation data of the user in the virtual space;

tool tracking data acquisition means for acquiring tracking data of a tool that the user handles;

first calculation means for calculating, based on the tracking data of the tool, three-dimensional coordinate data to display a virtual tool body corresponding to the tool in the virtual space displayed by the virtual-space provision system;

second calculation means for calculating, based on the three-dimensional coordinate data of the virtual flying object and the three-dimensional coordinate data of the virtual tool body, three-dimensional coordinate data of a flying orbit of the virtual flying object, three-dimensional coordinate data being created by an impact between the virtual flying object and the virtual tool body in the virtual space;

first image generation means for generating, based on the three-dimensional coordinate data, the object data, and the position data and the orientation data of the user, trajectory videos of the virtual flying object, the virtual moving body, and the virtual tool body that are viewed from a viewpoint position in the virtual space, the viewpoint position corresponding to the user's position and posture, to display the trajectory videos on display means of the virtual-space provision system; and second image generation means for generating, based on the three-dimensional coordinate data of the flying orbit of the virtual flying object, the three-dimensional coordinate data being created by the impact between the virtual flying object and the virtual tool body in the virtual space, a trajectory video of the flying orbit of the virtual flying object viewed from a viewpoint position in the virtual space, the viewpoint position corresponding to the user's position and posture to display the trajectory video on the display means of the virtual-space provision system.

(Supplementary Note 6)

The virtual-reality provision system according to supplementary note 5, wherein the storage means stores flying object data on at least sizes of a plurality of virtual flying objects and flying object restitution coefficient data of a restitution coefficient of the plurality of virtual flying object to the virtual tool, and tool data on at least sizes of a plurality of virtual tools and tool restitution coefficient data of a restitution coefficient of the plurality of virtual tools to the virtual flying object; and wherein the second calculation means calculates, referring to the flying object data and the object restitution coefficient data of the same, and the tool data and the restitution coefficient data of the same, new trajectory data of the virtual flying object that is created by an impact between the virtual flying object and the virtual tool body.

(Supplementary Note 7)

The virtual-reality provision system according to supplementary note 5 or supplementary note 6, comprising:

a tabulation server;

wherein the virtual-space provision system comprises third calculation means for calculating an impact result if there was an impact between the virtual flying object and the virtual tool body and a flying result of the virtual flying object that is obtainable from the three-dimensional coordinate data of the flying orbit of the virtual flying object; and transmission means for transmitting the impact result and the flying result to the tabulation server; and wherein the tabulation server comprises means for calculating an aggregation result by aggregating the impact result and the flying result that are delivered from the transmission means and transmitting the aggregation result to an organization device to display the aggregation result in a broadcast video or a broadcast transmission video that are real videos of the real athlete.

(Supplementary Note 8)

The virtual reality provision system according to any one of supplementary note 1 to supplementary note 7, wherein the virtual-space provision system is a head mounted display system comprising:

display means for displaying, by being mounted to the user's head, a three-dimensional video of a virtual space; and three-dimensional video generation means for generating the three-dimensional video of the virtual space.

(Supplementary Note 9)

A computer program for a virtual-space provision system that provides a three-dimensional video of a virtual space to a user, the program making a computer execute:

processing of receiving three-dimensional coordinate data, from broadcast transmission means, to display a virtual flying object corresponding to a flying object thrown by a real athlete on the mound in a virtual space, the three-dimensional coordinate data being generated based on at least tracking data of the flying object, the tracking data being obtained from a sensor;

processing of detecting user's position data and user's orientation data in the virtual space; and processing of generating, based on the three-dimensional coordinate data of the virtual flying object, the object data of the virtual flying object, and the user's position data and the user's orientation data, a trajectory video of the virtual flying object viewed from a viewpoint position in the virtual space, the viewpoint position corresponding to the user's position and posture.

(Supplementary Note 10)

The computer program according to supplementary note 9, wherein the program further making a computer execute:

processing of acquiring tracking data of a tool that the use handles;

processing of calculating, based on the tracking data of the tool, three-dimensional coordinate data of a virtual tool body corresponding to the tool; processing of calculating, based on the three-dimensional coordinate data of the virtual flying object and the three-dimensional coordinate data of the virtual tool body, three-dimensional coordinate data of a flying orbit of the virtual flying object, the three-dimensional coordinate data being created by an impact between the virtual flying object and the virtual tool body in the virtual space;

processing of generating, based on the three-dimensional coordinate data, the object data, and the user's position data and the user's orientation data, trajectory videos of the virtual flying object and the virtual tool body viewed from a viewpoint position in the virtual space, the viewpoint position corresponding to the user's position and posture, to display the trajectory videos on display means of the virtual-space provision system; and processing of generating, based on the three-dimensional coordinate data of the flying orbit of the virtual flying object that is created by the impact between the virtual flying object and the virtual tool body in the virtual space, a trajectory video of the flying orbit of the virtual flying object viewed from a viewpoint position in the virtual space, the viewpoint position corresponding to the user's position and posture.

(Supplementary Note 11)

The program according to supplementary note 9 or supplementary note 10, wherein the program further making a computer execute:

processing of calculating an impact result if there was an impact between the virtual flying object and the virtual tool body and a flying result of the virtual flying object that is obtainable from the three-dimensional coordinate data of the flying orbit of the virtual flying object; and processing of transmitting the impact result and the flying result to a server that aggregates the impact result and the flying result.

(Supplementary Note 12)

The computer program according to any one of supplementary note 9 to supplementary note 11, wherein the virtual-space provision system is a head mounted display system that comprises display means for displaying a three-dimensional video of a virtual space and three-dimensional video generation means for generating a three-dimensional video of the virtual space, the head mounted display system being mounted to the head of the user.

Although the present invention has been fully described by way of the preferred embodiments, it is to be noted that the present invention will not be limited to those embodiments but various changes and modifications can be made to those embodiments without departing from the spirit and scope of the invention.

REFERENCE CHARACTER LIST 1 athlete (real athlete)
2 tracking system
3 three-dimensional (3D) display data generation server
4 broadcast transmission system
head mounted display system
6 camera
7 broadcasting equipment
8 TV
9 live video generation unit
delivery data generation server
11 tabulation server
12 prediction server

The invention claimed is:

1. A virtual-reality provision system comprising:
a three-dimensional-display-data provision device and at least one virtual-space provision system;
wherein the three-dimensional-display-data provision device comprises:
receiver to receive tracking data of a flying object thrown by an athlete, the tracking data being obtained from sensor information of a sensor that tracks the flying object,
one or more first processor configured to generate, by using the acquired tracking data, three-dimensional display data to display, in a virtual space, a flight video of a virtual flying object corresponding to the flying object and generate timing information, the timing information being about the timing at which the virtual-space provision system displays the flight video of the virtual flying object in synchronization with a predetermined video section of a game video of the athlete, the game video being broadcasted or delivered, and
transmitter to transmit the three-dimensional display data of the virtual flying object and the timing information to the at least one virtual-space provision system,
wherein the virtual-space provision system comprises:
a display unit to display a virtual space;
a storage unit to store object data of the virtual flying object and object data of a virtual tool body corresponding to a tool the user handles;
a receiver to receive the three-dimensional display data of the virtual flying object and the timing information; and
one or more second processor;
wherein the second processor is further configured to:
detect a user's position and a user's orientation in the virtual space,
obtain tracking data of the tool that the user operates,
calculate, based on the tracking data of the tool, three-dimensional display data to display a trajectory video of the virtual tool body corresponding to the tool in a virtual space that is to be displayed,
calculate, based on the three-dimensional display data of the virtual flying object and the three-dimensional display data of the virtual tool body, three-dimensional display data of the flight video of the virtual flying object, the three-dimensional display data being created by the impact between the virtual flying object and the virtual tool body in the virtual space, generate, based on the three-dimensional display data of the virtual flying object and the virtual tool body, the object data, and the user's position and orientation, a first flight video of the virtual flying object viewed from a viewpoint position in the virtual space, the viewpoint position corresponding to the user's position and posture, and a trajectory video of the virtual tool body, display the first flight video on the display unit using timing information, display the trajectory video on the display unit, generate, based on the three-dimensional display data of the flying orbit of the virtual flying object that is created by an impact between the virtual flying object and the virtual tool body in the virtual space, a second flight video of the virtual flying object viewed from a viewpoint position in the virtual space, the viewpoint position corresponding to the user's position and posture and display the second flight video on the display unit.

2. The virtual-reality provision system according to claim 1, wherein the first processor is further configured to generate delivery data that contains video data of the game video of the athlete and the three-dimensional display data to deliver the generated delivery data to the at least one virtual-space provision system via the transmitter;

wherein the second processor is further configured to receive the delivery data and separate video data of a real video from the three-dimensional display data to display the flight video of the virtual flying object by using the three-dimensional display data.

3. The virtual-reality provision system according to claim 1:

wherein the first processor is further configured to causes three-dimensional display data identification information to be contained in the three-dimensional display data, the three-dimensional display data identification information identifying the three-dimensional display data;

wherein a broadcast station broadcasts, via data broadcast or hybridcast, the three-dimensional display data identification information at the timing at which the flight video of the virtual flying object is displayed by the virtual-space provision system; and wherein the second processor is further configured to obtain the three-dimensional display data identification information via data broadcast or hybridcast and display the flight video of the virtual flying object by using three-dimensional display data specified by the three-dimensional display data identification information among the received three-dimensional display data.

4. The virtual-reality provision system according to claim 1:

wherein the storage unit stores flying object data on at least sizes of a plurality of virtual flying objects, tool data on at least sizes of a plurality of virtual tools, and tool restitution coefficient data of a restitution coefficient of the plurality of virtual tools to the virtual flying object; and wherein the second processor is further configured to calculate, referring to the flying object data, the tool data, and the restitution coefficient data, new three-dimensional display data of the flight video of the virtual flying object, the three-dimensional display data being created by an impact between the virtual flying object and the virtual tool body.

5. The virtual-reality provision system according to claim 1, further comprising an aggregate unit;

wherein the second processor configured to calculate an impact result if there was an impact between the virtual flying object and the virtual tool body and a flying result of the virtual flying object that is obtainable from the three-dimensional display data of the flight video of the virtual flying object and transmit the impact result and the flying result to the aggregate unit; and wherein the aggregate unit comprises third processor configured to calculate an aggregate result by aggregating the impact result and the flying result that are delivered from the virtual-space provision system and transmits the aggregate result to an organization device to display the aggregate result in a broadcast video or a distribution video that are videos of the real athlete.

6. The virtual-reality provision system according to claim 1, further comprising a prediction unit, wherein the prediction unit comprises fourth processor configured to predict flying of the flying object thrown by the athlete by performing machine learning based on past performances of the flying object thrown by the athlete and by inputting the acquired tracking data;

wherein the first processor is configured to generate three-dimensional display data of predicted flying of the flying object.

7. The virtual-space provision system according to claim 1, wherein the virtual-space provision system is a head mounted display system.

8. A virtual-space provision system, comprising:

a display unit to display a virtual space;

a receiver to receive three-dimensional display data to display, in the virtual space, a flight video of the virtual flying object corresponding to the flying object, the flight video being generated based on tracking data obtained from sensor information of a sensor that tracks the flying object thrown by an athlete and timing information being about the timing at which the virtual-space provision system displays the flight video of the virtual flying object in synchronization with a predetermined video section of a game video of the athlete, the game video being broadcasted or delivered;

a storage unit for storing object data of the virtual flying object and object data of a virtual tool body corresponding to a tool that the user handles;

one or more processor configured to:

detect a user's position and the user's orientation in the virtual space;

obtain tracking data of the tool that the user handles;

calculate, based on the tracking data of the tool, three-dimensional display data to display a trajectory video of the virtual tool body corresponding to the tool in a virtual space to be displayed;

calculate, based on the three-dimensional display data of the virtual flying object and the three-dimensional display data of the virtual tool body, three-dimensional display data of a flight video of the virtual flying object that is created by an impact between the virtual flying object and the virtual tool body in the virtual space;

generate, based on the three-dimensional display data of the virtual flying object and the virtual tool body, the object data, and the user's position and orientation, a first flight video of the virtual flying object viewed from a viewpoint position in the virtual space, the viewpoint position corresponding to the user's position and posture, and a trajectory video of the virtual tool body;

display the first flight video on the display unit using the timing information;

display the trajectory video on the display unit;

generate, based on the three-dimensional display data of the flight video of the virtual flying object that is created by an impact between the virtual flying object and the virtual tool body in the virtual space, a second flight video of the virtual flying object viewed from a viewpoint position in the virtual space, the viewpoint position corresponding to the user's position and posture and display the second flight video on the display unit.

9. The virtual-space provision system according to claim 8:

wherein the storage unit stores flying object data on at least sizes of a plurality of virtual flying object, tool data on at least sizes of a plurality of virtual tools, and tool restitution coefficient data of a restitution coefficient of the plurality of virtual tools to the virtual flying object; and wherein the processor is further configured to calculate, referring to the flying object data, the tool data, and the restitution coefficient data, new three-dimensional display data of the flight video of the virtual flying object that is created by an impact between the virtual flying object and the virtual tool body.

10. The virtual-space provision system according to claim 8, wherein the processor is further configured to calculate an impact result if there was an impact between the virtual flying object and the virtual tool body and a flying result of the virtual flying object obtainable from the three-dimensional display data of the flight video of the virtual flying object and transmit the calculated impact result and the calculated flying result to an aggregate unit that aggregates the impact result and the flying result.

11. The virtual-space provision system according to claim 8, wherein the virtual-space provision system is a head mounted display system.

* * * * *